United States Patent
Bok et al.

(10) Patent No.: US 12,541,261 B2
(45) Date of Patent: Feb. 3, 2026

(54) ELECTRONIC DEVICE

(71) Applicant: Samsung Display Co., Ltd., Yongin-si (KR)

(72) Inventors: Seung-Lyong Bok, Yongin-si (KR); Kicheol Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/825,164

(22) Filed: Sep. 5, 2024

(65) Prior Publication Data

US 2025/0173010 A1  May 29, 2025

(30) Foreign Application Priority Data

Nov. 28, 2023 (KR) .................. 10-2023-0167762

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0446* (2019.05)

(58) Field of Classification Search
CPC ... G06F 3/0412; G06F 3/0446; G06F 3/04164
See application file for complete search history.

(56) References Cited

U.S. PATENT DOCUMENTS

| | | | |
|---|---|---|---|
| 9,851,855 B2 | 12/2017 | Bok | |
| 10,572,044 B2 | 2/2020 | Yoo et al. | |
| 10,599,277 B2 | 3/2020 | Xie et al. | |
| 11,106,319 B2* | 8/2021 | Ullmann | G06F 3/04164 |
| 11,507,233 B2 | 11/2022 | Gwon et al. | |
| 11,531,438 B2 | 12/2022 | Smith et al. | |
| 11,556,216 B2* | 1/2023 | Blondin | G06F 3/0446 |
| 2011/0017524 A1 | 1/2011 | Chen et al. | |
| 2012/0229416 A1 | 9/2012 | Ku et al. | |
| 2020/0249794 A1* | 8/2020 | Ullmann | G06F 3/0446 |
| 2021/0240303 A1* | 8/2021 | Blondin | G06F 3/0443 |
| 2022/0391043 A1 | 12/2022 | Zhang et al. | |
| 2023/0100129 A1* | 3/2023 | Vaze | G06F 3/044 |
| | | | 345/173 |

(Continued)

FOREIGN PATENT DOCUMENTS

| | | |
|---|---|---|
| CN | 206058160 U | 3/2017 |
| DE | 102017118937 | 2/2019 |
| EP | 3316103 A1 | 5/2018 |

(Continued)

*Primary Examiner* — Peter D McLoone
(74) *Attorney, Agent, or Firm* — F.CHAU & ASSOCIATES, LLC

(57) ABSTRACT

An electronic device may include a display layer and a sensor layer. The sensor layer may include multiple row sensing electrodes extending in a first direction, multiple column sensing electrodes extending in a second direction, multiple first trace lines electrically connected to the row sensing electrodes, and multiple second trace lines electrically connected to the column sensing electrodes. The first trace lines may be arranged in a sensing area and overlap the row sensing electrodes and the column sensing electrodes. Each of the column sensing electrodes may include an open part extending in the second direction and overlapping one of the first trace lines.

25 Claims, 18 Drawing Sheets

(56) References Cited

U.S. PATENT DOCUMENTS

2023/0118216 A1    4/2023   Smith et al.
2023/0367413 A1   11/2023   Gao

FOREIGN PATENT DOCUMENTS

| KR | 10-2020-0083195 | 7/2020 |
| KR | 10-2021-0147926 | 12/2021 |
| KR | 10-2022-0084538 | 6/2022 |
| KR | 10-2499519 | 2/2023 |

\* cited by examiner

ELECTRONIC DEVICE

CROSS-REFERENCE TO RELATED APPLICATION(S)

This application claims priority under 35 U.S.C. § 119 from Korean Patent Application No. 10-2023-0167762 filed on Nov. 28, 2023 in the Korean Intellectual Property Office, the entire contents of which are incorporated herein by reference.

BACKGROUND

1. Technical Field

Embodiments of the disclosure described herein relate to an electronic device having improved visibility.

2. Description of the Related Art

Multimedia electronic devices such as a television, a mobile phone, a tablet computer, a navigation system, a game console, and a vehicle display may display images and may provide a touch-based input scheme, which allows a user to input information or a command intuitively, conveniently, and readily, in addition to typical input devices such as a button, a keyboard, and a mouse.

SUMMARY

Embodiments of the disclosure provide an electronic device having improved visibility and improved sensing performance of an input sensor.

According to an embodiment, an electronic device may include a display layer in which a display area and a non-display area adjacent to the display area are defined, and a sensor layer in which a sensing area corresponding to the display area and a non-sensing area adjacent to the sensing area are defined.

The sensor layer may include a plurality of row sensing electrodes arranged in the sensing area and including a plurality of sub-sensing electrodes arranged in a first direction, a plurality of first trace lines electrically connected to the plurality of row sensing electrodes and overlapping the sensing area, a plurality of column sensing electrodes arranged in the sensing area and extending in a second direction intersecting the first direction, a plurality of second trace lines electrically connected to the plurality of column sensing electrodes, and a bridge electrode electrically connecting a first sub-sensing electrode and a second sub-sensing electrode spaced apart from each other in the first direction among the plurality of sub-sensing electrodes.

Each of the plurality of column sensing electrodes may include an open part extending in the second direction and overlapping one of the plurality of first trace lines.

According to an embodiment, a boundary open part may be defined between two column sensing electrodes spaced apart from each other among the plurality of column sensing electrodes.

According to an embodiment, the first sub-sensing electrode may overlap the open part, and the second sub-sensing electrode may overlap the boundary open part.

According to an embodiment, the each of the plurality of column sensing electrodes may include a first sensing part disposed between the first sub-sensing electrode and the second sub-sensing electrode in the first direction, and a second sensing part extending from the first sensing part in the second direction and having a greater width than a width of the first sensing part, and the first sensing part and the second sensing part may be integral with each other.

According to an embodiment, the bridge electrode may overlap the first sensing part.

According to an embodiment, each of the plurality of row sensing electrodes may include a first sub-row sensing electrode, and a second sub-row sensing electrode spaced apart from the first sub-row sensing electrode in the second direction, and the first sub-row sensing electrode and the second sub-row sensing electrode may be electrically connected to each other.

According to an embodiment, each of the plurality of first trace lines may be electrically connected to the first sub-row sensing electrode through a first sub-contact hole and may be electrically connected to the second sub-row sensing electrode through a second sub-contact hole.

According to an embodiment, each of the plurality of row sensing electrodes may further include a connection electrode disposed in the non-display area and electrically connecting the first sub-row sensing electrode and the second sub-row sensing electrode to each other.

According to an embodiment, the sensor layer may further include a plurality of dummy trace lines electrically connected to the plurality of row sensing electrodes and overlapping the sensing area.

According to an embodiment, one of the plurality of dummy trace lines may overlap the boundary open part.

According to an embodiment, the sensing area may include a first sub-sensing area and a second sub-sensing area spaced apart from each other in the first direction, and the plurality of row sensing electrodes may include first side row sensing electrodes arranged in the first sub-sensing area, and second side row sensing electrodes arranged in the second sub-sensing area.

According to an embodiment, the first side row sensing electrodes may be spaced apart from and electrically isolated from the second side row sensing electrodes in the first direction, and the plurality of first trace lines may include first side trace lines overlapping the first sub-sensing area and electrically connected to the first side row sensing electrodes, and second side trace lines overlapping the second sub-sensing area and electrically connected to the second side row sensing electrodes.

According to an embodiment, the sensing area may include a first sub-sensing area and a second sub-sensing area spaced apart from each other in the first direction, and a third sub-sensing area and a fourth sub-sensing area spaced apart from each other in the first direction and spaced apart from the first sub-sensing area and the second sub-sensing area in the second direction, and the plurality of row sensing electrodes may include first side row sensing electrodes arranged in the first sub-sensing area, second side row sensing electrodes arranged in the second sub-sensing area, third side row sensing electrodes arranged in the third sub-sensing area, and fourth side row sensing electrodes arranged in the fourth sub-sensing area.

According to an embodiment, the first side row sensing electrodes may be spaced apart from and electrically isolated from the second side row sensing electrodes in the first direction, the third side row sensing electrodes may be spaced apart from and electrically isolated from the fourth side row sensing electrodes in the first direction, and the plurality of first trace lines may include $(1-1)^{th}$ trace lines overlapping the first sub-sensing area and electrically connected to the first side row sensing electrodes, $(1-2)^{th}$ trace lines overlapping the second sub-sensing area and electrically connected to the second side row sensing electrodes, $(1\text{-}3)^{th}$ trace lines overlapping the third sub-sensing area and electrically connected to the third side row sensing electrodes, and $(1\text{-}4)^{th}$ trace lines overlapping the fourth sub-sensing area and electrically connected to the fourth side row sensing electrodes.

According to an embodiment, the plurality of column sensing electrodes may include first side column sensing electrodes arranged in the first sub-sensing area, second side column sensing electrodes arranged in the second sub-sensing area, third side column sensing electrodes arranged in the third sub-sensing area and spaced apart from the first side column sensing electrodes in the second direction and fourth side column sensing electrodes arranged in the fourth sub-sensing area and spaced apart from the second side column sensing electrodes in the second direction.

According to an embodiment, the plurality of second trace lines may include $(2\text{-}1)^{th}$ side trace lines electrically connected to the first side column sensing electrodes, $(2\text{-}2)^{th}$ side trace lines electrically connected to the second side column sensing electrodes, $(2\text{-}3)^{th}$ side trace lines overlapping the first sub-sensing area and electrically connected to the third side column sensing electrodes, and $(2\text{-}4)^{th}$ side trace lines overlapping the second sub-sensing area and electrically connected to the fourth side column sensing electrodes.

According to an embodiment, each of the $(2\text{-}3)^{th}$ side trace lines and the $(2\text{-}4)^{th}$ side trace lines may include a first line part, the first line part and the plurality of first trace lines may be disposed on a same layer, and a second line part, the second line part and the plurality of column sensing electrodes may be disposed on a same layer.

According to an embodiment, each of the plurality of row sensing electrodes and each of the plurality of column sensing electrodes may include mesh lines, and each of the plurality of first trace lines may have a smaller width than that of the mesh lines in the sensing area.

According to an embodiment, each of the plurality of first trace lines may have a multi-layer structure.

According to an embodiment, an electronic device may include a display layer in which a display area and a non-display area adjacent to the display area are defined, a sensor layer in which a sensing area corresponding to the display area and a non-sensing area adjacent to the sensing area are defined, and a sensor driving portion electrically connected to the sensor layer and including a differential amplifier.

The sensor layer may include first segment sensing electrodes arranged in the sensing area, second segment sensing electrodes arranged in the sensing area and alternately arranged in a first direction with the first segment sensing electrodes, a plurality of first segment trace lines that overlap the sensing area and electrically connecting the first segment sensing electrodes to a first terminal of the differential amplifier, a plurality of second segment trace lines that overlap the sensing area and electrically connecting the second segment sensing electrodes to a second terminal of the differential amplifier, a plurality of column sensing electrodes arranged in the sensing area and extending in a second direction intersecting the first direction, and a plurality of second trace lines electrically connected to the plurality of column sensing electrodes.

A first column sensing electrode among the plurality of column sensing electrodes may include a first open part extending in the second direction and overlapping one of the plurality of first segment trace lines, and a second column sensing electrode among the plurality of column sensing electrodes may include a second open part extending in the second direction and overlapping one of the plurality of second segment trace lines.

According to an embodiment, the sensor layer may further include a first connection wiring line electrically connecting $(1\text{-}1)^{th}$ segment sensing electrodes arranged in a first row among the first segment sensing electrodes, and a second connection wiring line electrically connecting $(2\text{-}1)^{th}$ segment sensing electrodes arranged in the first row among the second segment sensing electrodes, and the first connection wiring line and the second connection wiring line may extend in the first direction and may intersect the plurality of column sensing electrodes in a plan view.

According to an embodiment, each of the plurality of first segment trace lines and the plurality of second segment trace lines may include an intersection portion intersecting the first connection wiring line and the second connection wiring line, and a non-intersection portion not intersecting the first connection wiring line and the second connection wiring line, and the intersection portion and the non-intersection portion may be arranged in different layers.

According to an embodiment, the non-intersection portion, the first connection wiring line, and the second connection wiring line may be arranged on a first sensor insulating layer, and the intersection portion, the first segment sensing electrodes, and the second segment sensing electrodes may be arranged on a second sensor insulating layer.

According to an embodiment, each of the first segment sensing electrodes may include a plurality of first sub-segment electrodes, and a first sub-bridge electrode electrically connecting the plurality of first sub-segment electrodes, and each of the second segment sensing electrodes may include a plurality of second sub-segment electrodes, and a second sub-bridge electrode electrically connecting the plurality of second sub-segment electrodes.

According to an embodiment, the first sub-bridge electrode and the second sub-bridge electrode may be arranged on a different layer from that of the first sub-segment electrodes and the second sub-segment electrodes, and the first sub-bridge electrode, the second sub-bridge electrode, the first connection wiring line, and the second connection wiring line may be arranged on a same layer.

According to an embodiment, the sensor driving portion may be configured to provide a first transmission signal to the first column sensing electrode among the plurality of column sensing electrodes, and provide a second transmission signal to the second column sensing electrode adjacent to the first column sensing electrode among the plurality of column sensing electrodes, and the first transmission signal and the second transmission signal may have phases opposite to each other.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
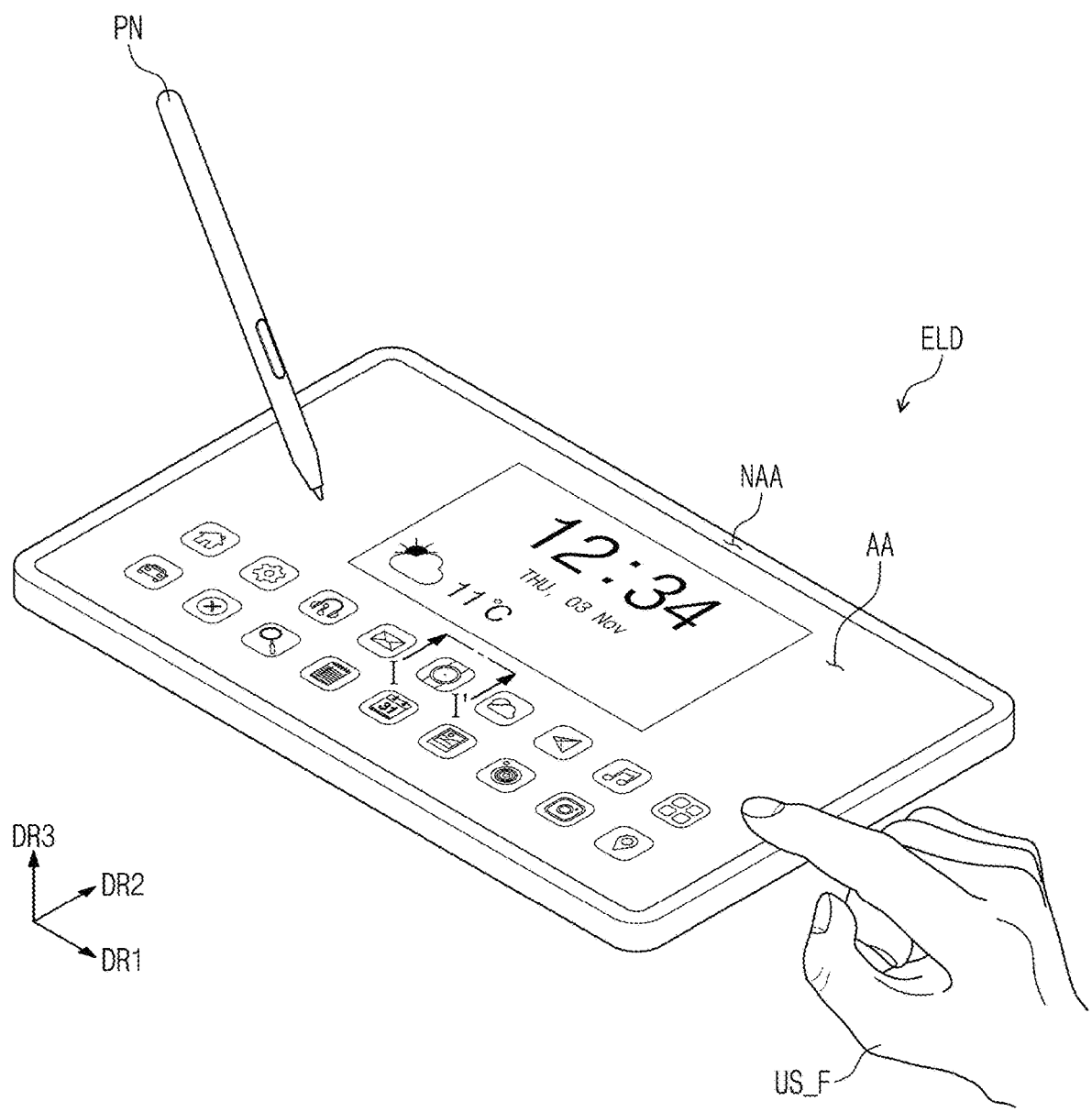
FIG. 1 is a perspective view of an electronic device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc., (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may be different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc., may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including,"

when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, parts, and/or modules. Those skilled in the art will appreciate that these blocks, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, parts, and/or modules being implemented by microprocessors or other similar hardware, they may be programmed and controlled using software (e.g., microcode) to perform various functions discussed herein and may optionally be driven by firmware and/or software. It is also contemplated that each block, part, and/or module may be implemented by dedicated hardware, or as a combination of dedicated hardware to perform some functions and a processor (e.g., one or more programmed microprocessors and associated circuitry) to perform other functions. Also, each block, part, and/or module of some embodiments may be physically separated into two or more interacting and discrete blocks, parts, and/or modules without departing from the scope of the inventive concepts. Further, the blocks, parts, and/or modules of some embodiments may be physically combined into more complex blocks, parts, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described with reference to the accompanying drawings.

FIG. 1 is a perspective view of an electronic device ELD according to an embodiment of the disclosure.

Referring to FIG. 1, the electronic device ELD may be a device that may be activated depending on an electrical signal. For example, the electronic device ELD may be a mobile phone, a portable mobile phone, a laptop, a television, a tablet personal computer (PC), a vehicle navigation system, a game console or a wearable device, but the disclosure is not limited thereto. FIG. 1 illustratively illustrates that the electronic device ELD may be a tablet PC.

The electronic device ELD may display an image and sense inputs applied from the outside. The external input may be input of a user. The input of the user may include various types of external inputs such as a portion US_F of a body of the user, a pen PN, light, heat, or pressure. The input of the user may include all inputs that may change a capacitance of the input sensor.

An active area AA and a peripheral area NAA may be defined in the electronic device ELD. The electronic device ELD may display an image through the active area AA. The active area AA may include a surface defined by a first direction DR1 and a second direction DR2. The peripheral area NAA may surround the active area AA. In an embodiment of the disclosure, the peripheral area NAA may be omitted.

A thickness direction of the electronic device ELD may be parallel to a third direction DR3 intersecting the first direction DR1 and the second direction DR2. Thus, front surfaces (or upper surfaces) and rear surfaces (or lower surfaces) of members constituting the electronic device ELD may be defined based on the third direction DR3.

The electronic device ELD that may be of a bar type is illustrated in FIG. 1 as an example, but the disclosure is not limited thereto. For example, the following descriptions may be applied to various electronic devices ELD such as a foldable electronic device, a rollable electronic device, or a slidable electronic device.

Figure 2A:
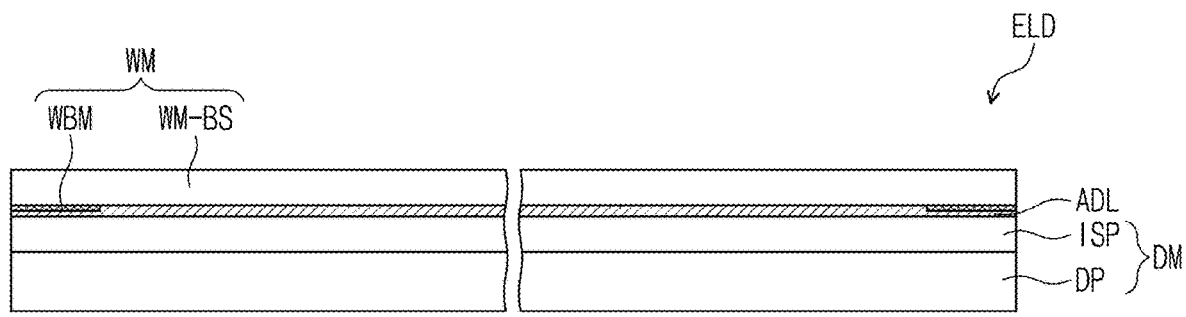
FIGS. 2A and 2B are schematic cross-sectional views of the electronic device according to an embodiment of the disclosure.
Figure 2B:
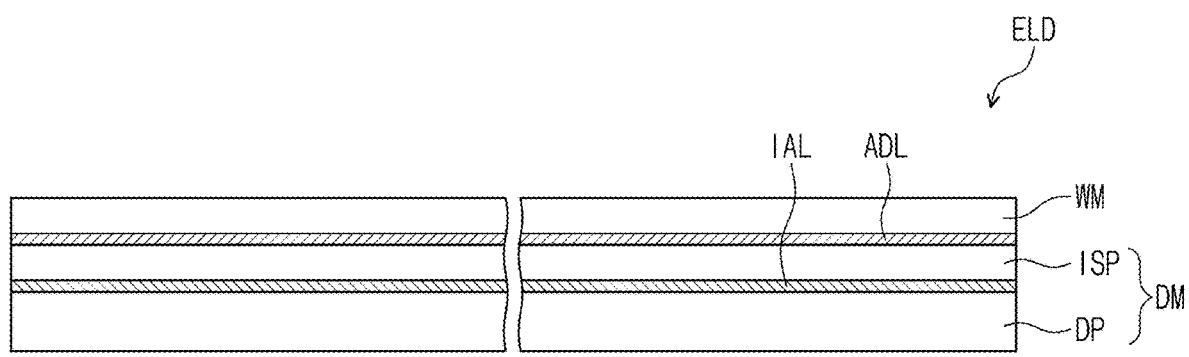

FIGS. 2A and 2B are schematic cross-sectional views of the electronic device according to an embodiment of the disclosure.

Referring to FIG. 2A, the electronic device ELD may include a display module DM and a window WM. The display module DM generates an image and senses an external input. The display module DM may include a display panel DP and an input sensor ISP. In the specification, the display panel DP may be referred to as a "display layer," and the input sensor ISP may be referred to as a "sensor layer."

The display panel DP may include a display area and a non-display area corresponding to the active area AA (see FIG. 1) and the peripheral area NAA (see FIG. 1) of the electronic device ELD, respectively.

The display panel DP is not particularly limited and may be, for example, a light emitting display panel such as an organic light emitting display panel or an inorganic light emitting display panel.

The input sensor ISP may be disposed (e.g., directly disposed) on the display panel DP. According to an embodiment of the disclosure, the input sensor ISP may be formed on the display panel DP by a consecutive process. In case that the input sensor ISP is disposed (e.g., directly disposed) on the display panel DP, an internal adhesive layer IAL may not be disposed between the input sensor ISP and the display panel DP. However, as illustrated in FIG. 2B, the internal adhesive layer IAL may be disposed between the input sensor ISP and the display panel DP. The input sensor ISP may not be manufactured by a continuous process together with the display panel DP, may be manufactured through a separate process from the display panel DP, and may be fixed to an upper surface of the display panel DP by the internal adhesive layer IAL.

The electronic device ELD may further include an optical member disposed on the display module DM. The optical member may be a reflection preventing layer that may reduce external light reflectance. The optical member may include a polarizer and a phase retarder. The polarizer and the phase retarder may be of a stretched type or coating type. In a coating optical film, an optical axis may be defined according to a stretching direction of a functional film. The coating optical film may include liquid crystal molecules arranged on a base film.

In an embodiment of the disclosure, the optical member may be omitted. The display module DM may further include a color filter and a black matrix that replace the optical member. The color filer and the black matrix may be arranged (e.g., directly arranged) on an upper surface of the input sensor ISP through a continuous process. The upper surface of the input sensor ISP may be provided by an insulating layer disposed on the uppermost side of the input sensor ISP.

The window WM may provide an outer surface of the electronic device ELD. The window WM may include a base substrate and may further include functional layers such as a reflection preventing layer and a fingerprint preventing layer.

Although not separately illustrated, the display module DM may further include at least one adhesive layer ADL. The adhesive layer ADL may couple components of the display module DM. The adhesive layer ADL may be an optical transparent adhesive layer or a pressure-sensitive adhesive layer.

As illustrated in FIG. 2A, the window WM may include a light shielding pattern WBM for defining the peripheral area NAA (see FIG. 1). The light shielding pattern WBM may be a colored organic film and may be formed on a surface of a window base layer WM-BS using, for example, a coating method.

Figure 2C:
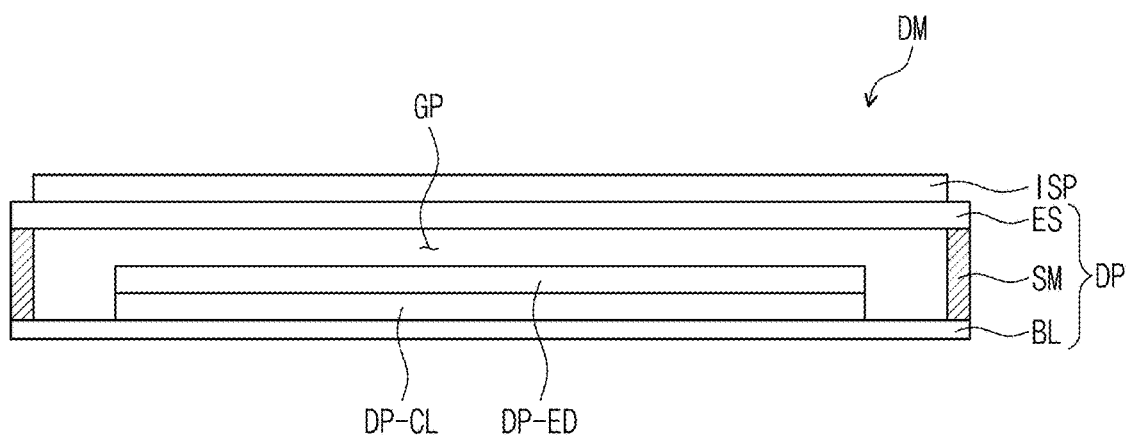
FIGS. 2C and 2D are schematic cross-sectional views of a display module according to an embodiment of the disclosure.
Figure 2D:
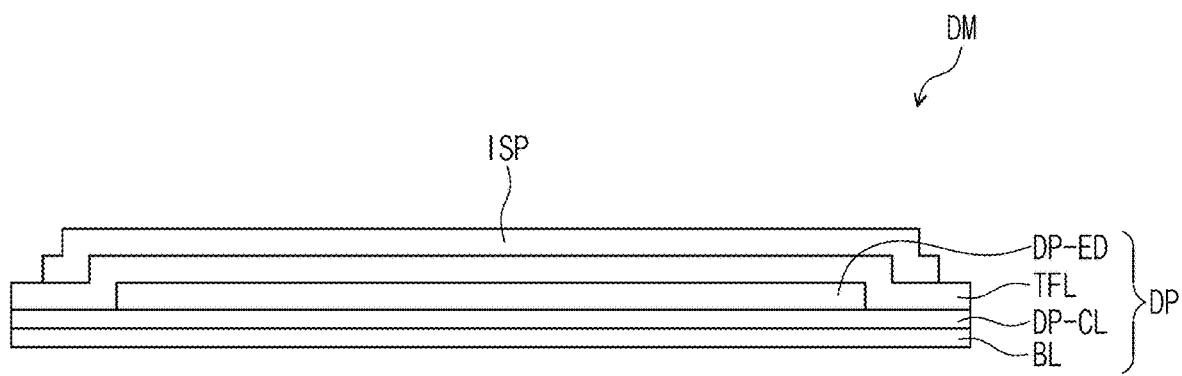

FIGS. 2C and 2D are schematic cross-sectional views of a display module according to an embodiment of the disclosure.

Referring to FIG. 2C, the display module DM may include the display panel DP and the input sensor ISP. The display panel DP may include a base layer BL, a circuit element layer DP-CL and a display element layer DP-ED that may be arranged on the base layer BL, an encapsulation substrate ES, and a sealant SM that couples the base layer BL and the encapsulation substrate ES. The input sensor ISP may be disposed (e.g., directly disposed) on the encapsulation substrate ES.

The base layer BL may include at least one plastic film. The base layer BL may include a plastic substrate, a glass substrate, a metal substrate, an organic/inorganic composite material substrate, or a combination thereof. In an embodiment, the base layer BL may be a thin film glass substrate having a thickness of tens to hundreds of micrometers. The base layer BL may have a multi-layer structure. For example, the base layer BL may include an organic layer (e.g., a polyimide layer)/at least one inorganic layer/an organic layer (e.g., a polyimide layer).

The circuit element layer DP-CL may include at least one insulating layer and a circuit element. The insulating layer may include at least one inorganic layer and at least one organic layer. The circuit element may include signal lines, a pixel circuit, and the like. A detailed description thereof will be made below.

The display element layer DP-ED may include a least a light emitting element. The display element layer DP-ED may further include an organic layer such as a pixel defining film.

The encapsulation substrate ES may be spaced apart from the display element layer DP-ED with a gap (e.g., predetermined or selectable gap) GP therebetween. The base layer BL and the encapsulation substrate ES may include a plastic substrate, a glass substrate, a metal substrate, an organic/inorganic composite material substrate, or a combination thereof. The sealant SM may include an organic adhesive or frit. The gap GP may be filled with a material (e.g., predetermined or selectable material). A moisture absorbent or resin material may be filled in the gap GP.

As illustrated in FIG. 2D, the display panel DP may include the base layer BL, the circuit element layer DP-CL and the display element layer DP-ED arranged on the base layer BL, and an upper protecting layer TFL. The upper protecting layer TFL may include multiple thin films. The upper protecting layer TFL may include a capping layer for protecting the light emitting element. The upper protecting layer TFL may further include an encapsulation layer including at least an inorganic layer/organic layer/inorganic layer. The encapsulation layer may be disposed on the capping layer. The input sensor ISP may be disposed (e.g., directly disposed) on the upper protecting layer TFL.

Figure 3:
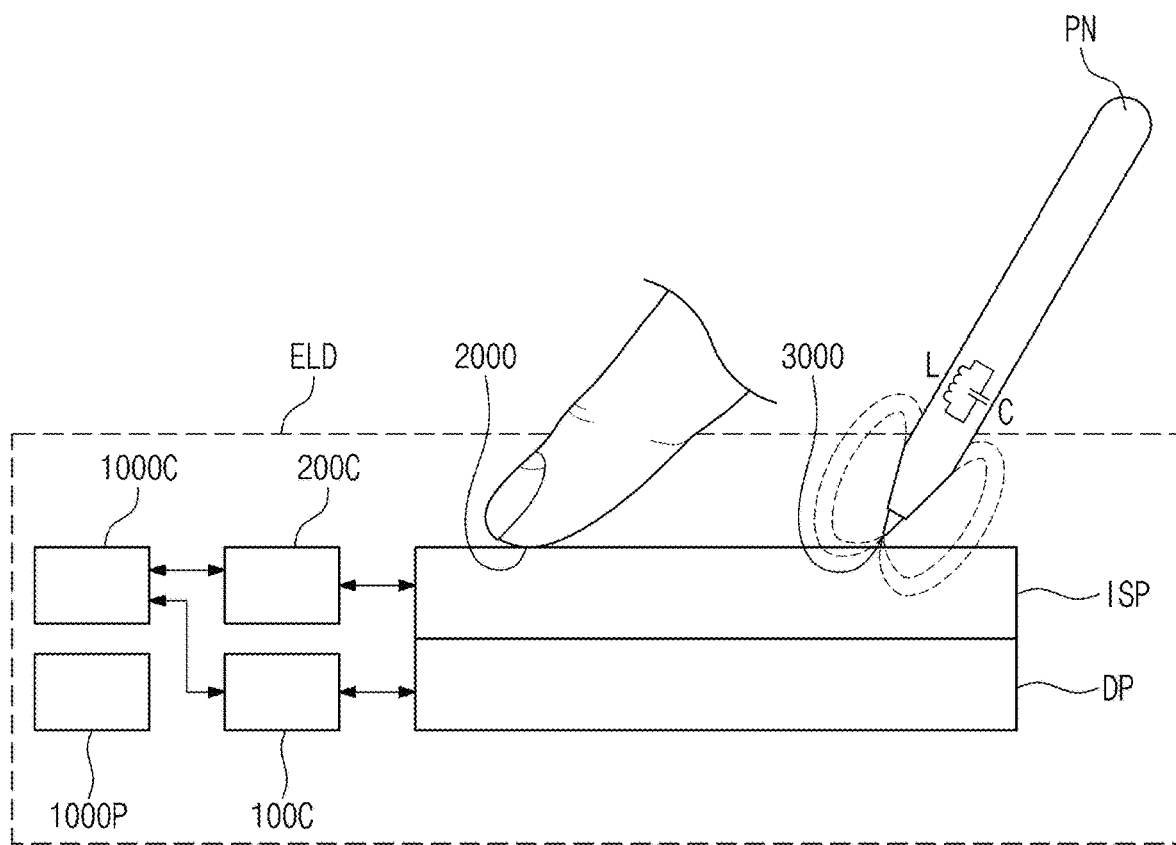
FIG. 3 is a view for describing an operation of the electronic device according to an embodiment of the disclosure.

FIG. 3 is a view for describing an operation of the electronic device according to an embodiment of the disclosure.

Referring to FIG. 3, the electronic device ELD may include the display panel DP, the input sensor ISP, a display driving portion 100C, a sensor driving portion 200C, a main driving portion 1000C, and a power circuit 1000P.

The input sensor ISP may sense a first input 2000 or a second input 3000 applied from the outside. Each of the first input 2000 and the second input 3000 may be an input portion capable of providing a change in a capacitance of the input sensor ISP or an input portion capable of causing an induced current in the input sensor ISP. For example, the first input 2000 may be a passive input portion such as the body of the user. The second input 3000 may be an input by the pen PN or an input by a radio frequency integrated circuit (RFIC) tag. For example, the pen PN may be a passive type pen or an active type pen.

In an embodiment of the disclosure, the pen PN may be a device that generates a magnetic field having a resonant frequency (e.g., predetermined or selectable resonant frequency). The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonance circuit, and the RLC resonance circuit may include an inductor "L" and a capacitor "C." In an embodiment of the disclosure, the RLC resonance circuit may be a variable resonance circuit that varies a resonance frequency. The inductor "L" may be a variable inductor and/or the capacitor "C" may be a variable capacitor. However, the disclosure is not particularly limited thereto.

The inductor "L" generates a current by a magnetic field formed in the input sensor ISP. However, the disclosure is not particularly limited thereto. For example, in case that the pen PN operates in an active type, the pen PN may generate a current even in case that a magnetic field is not provided from the outside. The generated current may be transmitted to the capacitor "C." The capacitor "C" charges a current input from the inductor "L" and discharges the charged current to the inductor "L." Thereafter, the inductor "L" may emit a magnetic field having a resonant frequency. An induced current may flow in the input sensor ISP by the magnetic field emitted by the pen PN, and the induced current may be transmitted to the sensor driving portion 200C as a reception signal (or a sensing signal or a signal).

The main driving portion 1000C may control the overall operation of the electronic device ELD. For example, the main driving portion 1000C may control operations of the display driving portion 100C and the sensor driving portion 200C. The main driving portion 1000C may include at least one microprocessor, and may further include a graphics processor. The main driving portion 1000C may be referred to as an application processor, a central processing portion, or a main processor.

The display driving portion 100C may drive the display panel DP. The display driving portion 100C may receive image data and a control signal from the main driving portion 1000C. The control signal may include various signals. For example, the control signal may include an input vertical synchronization signal, an input horizontal synchronization signal, a main clock, a data enable signal, and the like.

The sensor driving portion 200C may drive the input sensor ISP. The sensor driving portion 200C may receive the control signal from the main driving portion 1000C. The control signal may include a clock signal of the sensor driving portion 200C. Further, the control signal may further include a mode determining signal that determines driving modes of the sensor driving portion 200C and the input sensor ISP.

The sensor driving portion 200C may be implemented in an integrated circuit (IC) and electrically connected to the input sensor ISP. For example, the sensor driving portion 200C may be mounted (e.g., directly mounted) on an area (e.g., predetermined or selectable area) of the display panel or mounted on a separate printed circuit board in a chip on film (COF) method and electrically connected to the input sensor ISP.

The sensor driving portion 200C and the input sensor ISP may selectively operate in a first mode or a second mode. For example, the first mode may be a mode in which a touch input, for example, the first input 2000, may be sensed. The second mode may be a mode in which the pen PN, for example, the second input 3000, may be sensed. The first mode may be referred to as a touch sensing mode, and the second mode may be referred to as a pen sensing mode.

Switching between the first mode and the second mode may be performed in various manners. For example, the sensor driving portion 200C and the input sensor ISP may be time-dividedly driven in the first mode and the second mode and may sense the first input 2000 and the second input 3000. For example, the switching between the first mode and the second mode may be performed by selection of the user or a specific action of the user, one of the first mode and the second mode may be activated or deactivated by activating or deactivating a specific application, or a current mode may be switched from a mode to another mode. For example, while the sensor driving portion 200C and the input sensor ISP may be operating alternately in the first mode and the second mode, in case that the first input 2000 is sensed, the first mode may be maintained, and in case that the second input 3000 is sensed, the second mode may be maintained.

The sensor driving portion 200C may calculate input coordinate information based on a signal received from the input sensor ISP and may provide a coordinate signal having the coordinate information to the main driving portion 1000C. The main driving portion 1000C may execute an operation corresponding to the input of the user based on the coordinate signal. For example, the main driving portion 1000C may operate the display driving portion 100C such that a new application image may be displayed on display panel DP.

The power circuit 1000P may include a power management integrated circuit (PMIC). The power circuit 1000P may generate multiple driving voltages for driving the display panel DP, the input sensor ISP, the display driving portion 100C, and the sensor driving portion 200C. For example, the driving voltages may include a first driving voltage (e.g., an ELVSS voltage), a second driving voltage (e.g., an ELVDD voltage), an initialization voltage, and the like, but the disclosure is not particularly limited thereto.

Figure 4:
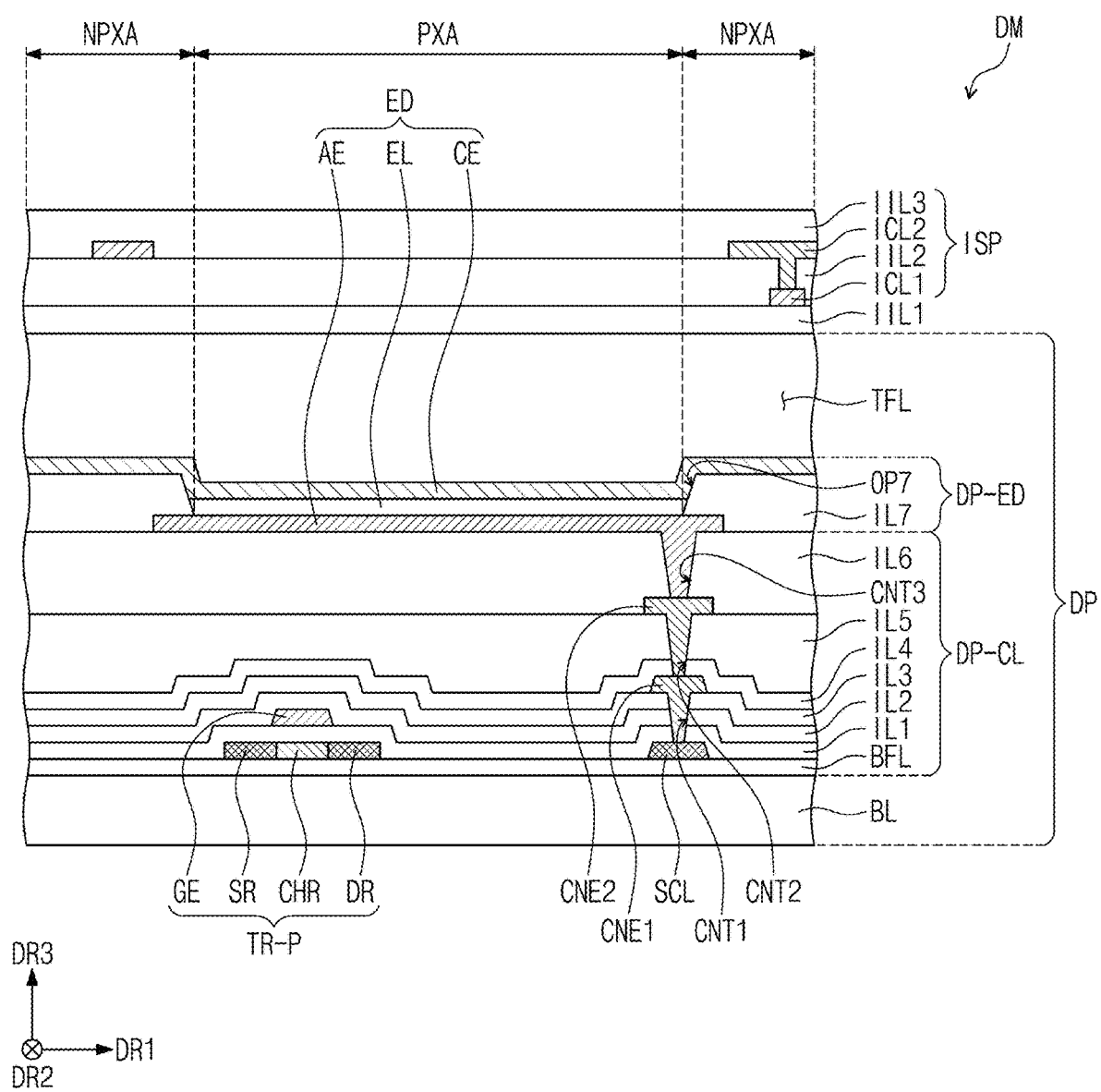
FIG. 4 is a schematic cross-sectional view of the display module according to an embodiment of the disclosure.

FIG. 4 is an enlarged schematic cross-sectional view of a display module according to an embodiment of the disclosure. FIG. 4 is view based on the display module of FIG. 2D.

Referring to FIG. 4, the display module DM may include the display panel DP and the input sensor ISP disposed (e.g., directly disposed) on the display panel DP. The display panel DP may include the base layer BL, the circuit element layer DP-CL, the display element layer DP-ED, and the upper protecting layer TFL. The input sensor ISP may be disposed (e.g., directly disposed) on the upper protecting layer TFL.

The display panel DP may include a display area on which an image may be displayed and a non-display area adjacent to the display area. FIG. 4 illustrates a portion of the display area in an enlarged manner.

The base layer BL may provide a base surface on which the circuit element layer DP-CL may be disposed. The circuit element layer DP-CL may be disposed on the base layer BL. The circuit element layer DP-CL may include an insulation layer, a semiconductor pattern, a conductive pattern, a signal line, and the like. The insulating layer, a semiconductor layer, and a conductive layer may be formed on the base layer BL in a manner such as coating and deposition, and thereafter, the insulating layer, the semiconductor layer, and the conductive layer may be selectively patterned through multiple photolithography processes. Thereafter, the semiconductor pattern, the conductive pattern, and the signal line included in the circuit element layer DP-CL may be formed.

At least one inorganic layer may be formed on an upper surface of the base layer BL. In an embodiment, it is illustrated that the circuit element layer DP-CL may include a buffer layer BFL. The buffer layer BFL may improve a coupling force between the base layer BL and the semiconductor pattern. The buffer layer BFL may include a silicon oxide layer and a silicon nitride layer, and the silicon oxide layer and the silicon nitride layer may be alternately laminated.

The semiconductor pattern may be disposed on the buffer layer BFL. The semiconductor pattern may include polysilicon. However, the disclosure is not limited thereto, and the semiconductor pattern may include amorphous silicon or metal oxide.

FIG. 4 merely illustrates a portion of the semiconductor pattern, and the semiconductor pattern may be further disposed in another area. The semiconductor pattern may be disposed in a specific pattern across the pixels. The semiconductor pattern may have a different electrical property depending on whether or not the semiconductor pattern is doped. The semiconductor pattern may include a first area having higher conductivity and a second area having lower conductivity. The first area may be doped with an N-type dopant or a P-type dopant. A P-type transistor may include a doped area doped with the P-type dopant. The second area may be a non-doped area or may be doped at a concentration lower than that of the first area.

A conductivity of the first area may be greater than a conductivity of the second area, and the first area substantially serves as an electrode or a signal line. The second area may substantially correspond to a channel area of a pixel transistor TR-P. In other words, a portion of the semiconductor pattern may be the channel area of a transistor, and another portion thereof may be a source area or drain area of the transistor.

Each of the pixels may have an equivalent circuit including seven transistors, one capacitor, and a light emitting element, and a schematic diagram of an equivalent circuit of the pixel may be modified into various forms. FIG. 4 illustratively illustrates one pixel transistor TR-P and one light emitting element ED included in the pixel.

A source area SR, a channel area CHR, and a drain area DR of the pixel transistor TR-P may be formed from the semiconductor pattern. The source area SR and the drain area DR may extend from the channel area CHR in opposite directions on a cross section. FIG. 4 illustrates a portion of a signal transmitting area SCL formed as the first area of the semiconductor pattern. Although not separately illustrated, the signal transmitting area SCL may be electrically connected to the pixel transistor TR-P in a plan view.

A first insulating layer IL1 may be disposed on the buffer layer BFL. The first insulating layer IL1 may commonly overlap the pixels and cover the semiconductor pattern. The first insulating layer IL1 may be an inorganic layer and/or an organic layer and may have a single-layer structure or a multi-layer structure. The first insulating layer IL1 may include at least one of an aluminum oxide, a titanium oxide, a silicon oxide, a silicon nitride, a silicon oxy nitride, a zirconium oxide, or a hafnium oxide. In an embodiment, the first insulating layer IL1 may be a single-layered silicon oxide layer. As well as the first insulating layer IL1, an insulating layer of the circuit element layer DP-CL, which will be described below, may be an inorganic layer and/or an organic layer and may have a single-layer structure or a multi-layer structure. The inorganic layer may include at least one of the above-described materials, but the disclosure is not limited thereto.

A gate GE of the pixel transistor TR-P may be disposed on the first insulating layer IL1. The gate GE may be a portion of a metal pattern. The gate GE overlaps the channel area CHR. The gate GE may function as a mask in a process of doping the semiconductor pattern.

A second insulating layer IL2 may be disposed on the first insulating layer IL1 and cover the gate GE. The second insulating layer IL2 may commonly overlap the pixels. The second insulating layer IL2 may be an inorganic layer and/or an organic layer and may have a single-layer structure or a multi-layer structure. In an embodiment, the second insulating layer IL2 may be a single-layered silicon oxide layer.

A third insulating layer IL3 may be disposed on the second insulating layer IL2, and in an embodiment, the third insulating layer IL3 may be a single-layered silicon oxide layer. A first connection electrode CNE1 may be disposed on the third insulating layer IL3. The first connection electrode CNE1 may be electrically connected to the signal transmitting area SCL through a contact hole CNT1 passing through the first insulating layer IL1, the second insulating layer IL2, and the third insulating layer IL3.

A fourth insulating layer IL4 may be disposed on the third insulating layer IL3. The fourth insulating layer IL4 may be a single-layered silicon oxide layer. A fifth insulating layer IL5 may be disposed on the fourth insulating layer IL4. The fifth insulating layer IL5 may be an organic layer. The fourth insulating layer IL4 may be omitted, and the fifth insulating layer IL5 may be disposed on the third insulating layer IL3.

A second connection electrode CNE2 may be disposed on the fifth insulating layer IL5. The second connection electrode CNE2 may be electrically connected to the first connection electrode CNE1 through a contact hole CNT2 penetrating the fourth insulating layer IL4 and the fifth insulating layer IL5.

A sixth insulating layer IL6 may be disposed on the fifth insulating layer IL5 and cover the second connection electrode CNE2. The sixth insulating layer IL6 may be an organic layer. The display element layer DP-ED may be disposed the circuit element layer DP-CL. The display element layer DP-ED may include the light emitting element ED. The light emitting element ED may include a first electrode AE, a light emitting layer EL, and a second electrode CE. For example, the light emitting layer EL may include an organic light emitting material, a quantum dot, a quantum rod, a micro LED, or a nano LED.

The first electrode AE may be disposed on the sixth insulating layer IL6. The first electrode AE may be electrically connected to the second connection electrode CNE2 through a contact hole CNT3 passing through the sixth insulating layer IL6.

A pixel defining film IL7 may be disposed on the sixth insulating layer IL6 and cover a portion of the first electrode AE. An opening OP7 may be defined in the pixel defining film IL7. The opening OP7 of the pixel defining film IL7 exposes at least a portion of the first electrode AE. In an embodiment, a light emitting area PXA may be defined to correspond to a partial area of the first electrode AE, which may be exposed by the opening OP7. A non-light emitting area NPXA may surround the light emitting area PXA.

The light emitting layer EL may be disposed on the first electrode AE. The light emitting layer EL may be disposed to correspond to the opening OP7. The light emitting layer EL may be formed separately from the pixels. In case that the light emitting layers EL are formed separately from the respective pixels, each of the light emitting layers EL may emit a light having at least one of a blue color, a red color, and a green color. However, the disclosure is not limited thereto, and the light emitting layer EL may be electrically connected to the pixels and may be provided commonly. The light emitting layer EL may provide a blue light or may provide a white light.

The second electrode CE may be disposed on the light emitting layer EL. The second electrode CE may have an integral shape and may be disposed in the pixels in common. A common voltage may be provided to the second electrode CE, and the second electrode CE may be referred to as a common electrode.

Although not illustrated, a hole control layer may be disposed between the first electrode AE and the light emitting layer EL. A hole control layer may be commonly disposed in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be formed in common in the pixels by using an open mask. The second electrode CE may be covered by the upper protecting layer TFL.

The input sensor ISP may be formed on (e.g., formed directly on) an upper surface of the upper protecting layer TFL through a continuous process. The input sensor ISP may include a first sensor insulating layer IIL1, a first sensor conductive layer ICL1, a second sensor insulating layer IIL2, a second sensor conductive layer ICL2, and a third sensor insulating layer IIL3. In the specification, the first sensor insulating layer IIL1 may be referred to as a "base insulating layer."

Each of the first sensor conductive layer ICL1 and the second sensor conductive layer ICL2 may include multiple patterns that have a single-layer structure or have a multi-layer structure in which layers may be laminated in the third direction DR3. The conductive layer having the single-layer structure may include a metal layer or a transparent conductive layer. The metal layer may include molybdenum, silver, titanium, copper, aluminum, alloys thereof, or a combination thereof. The transparent conductive layer may include a transparent conductive oxide such as an indium tin oxide (ITO), an indium a zinc oxide (IZO), a zinc oxide (ZnO), indium zinc tin oxide (IZTO), or a combination thereof. The transparent conductive layer may include a conductive polymer such as poly(3,4-ethylenedioxythiophene) (PEDOT), metal nanowire, graphene, the like, or a combination thereof.

The conductive layer having a multi-layer structure may include metal layers. The metal layers may have, for example, a three-layer structure of titanium/aluminum/titanium. The conductive layer having a multi-layer structure may include at least one metal layer and at least one transparent conductive layer.

The second sensor insulating layer IIL2 may cover the first sensor conductive layer ICL1, and the third sensor insulating layer IIL3 may cover the second sensor conductive layer ICL2. It is illustrated that the first sensor insulating layer IIL1 to the third sensor insulating layer IIL3 has a single layer, but the disclosure is not limited thereto.

At least one of the first sensor insulating layer IIL1 and the second sensor insulating layer IIL2 may include an inorganic film. The inorganic film may include at least one of an aluminum oxide, a titanium oxide, a silicon oxide, a silicon nitride, a silicon oxy nitride, a zirconium oxide, a hafnium oxide, or a combination thereof.

At least one of the second sensor insulating layer IIL2 and the third sensor insulating layer IIL3 may include an organic film. The organic film may include at least one of an acryl-based resin, a methacrylate-based resin, a polyisoprene-based resin, a vinyl-based resin, an epoxy-based resin, an urethane-based resin, a cellulose-based resin, a siloxane-based resin, a polyimide-based resin, a polyamide-based resin, a perylene-based resin, or a combination thereof.

Figure 5:
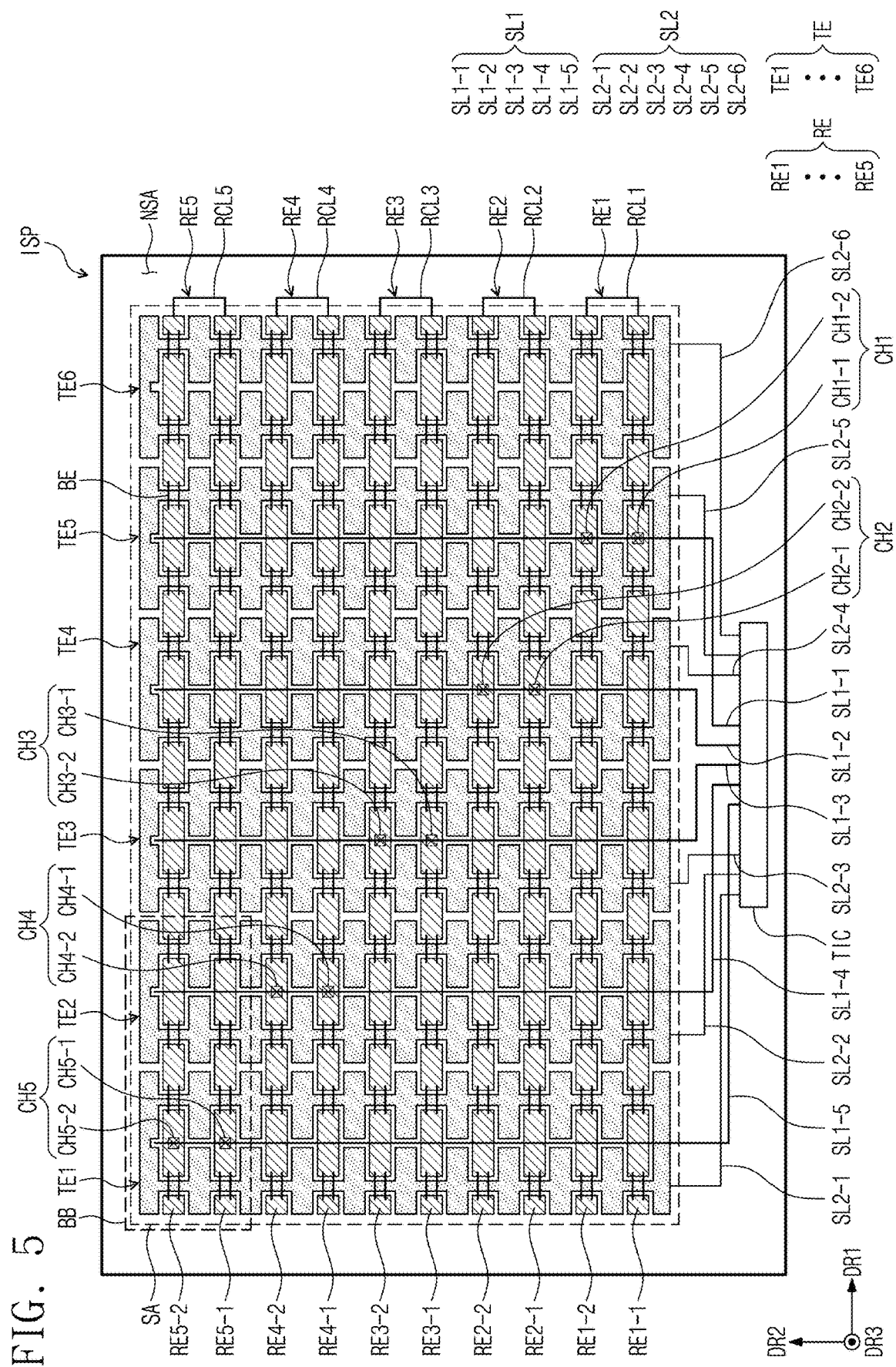
FIG. 5 is a plan view of an input sensor according to an embodiment of the disclosure.
Figure 6:
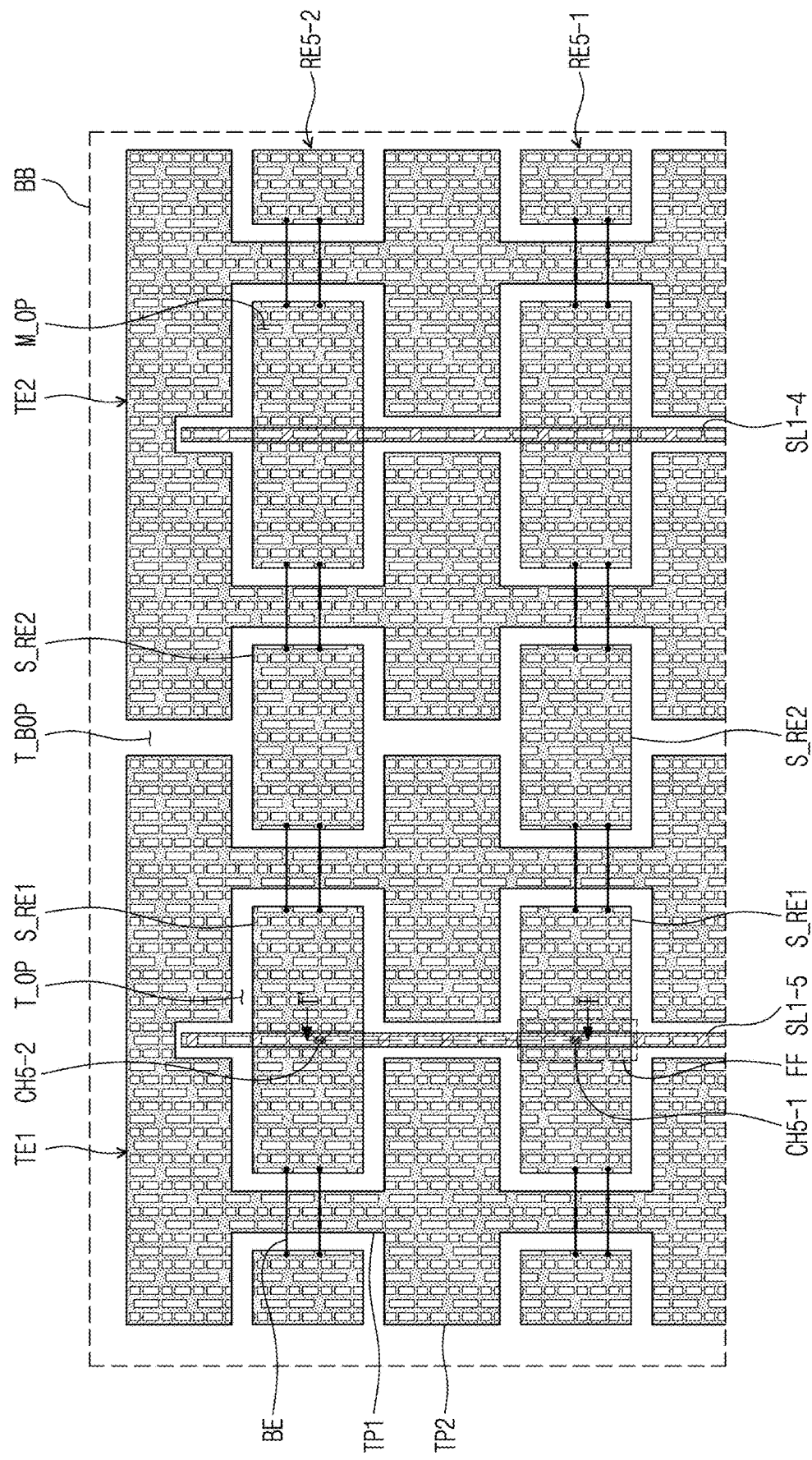
FIG. 6 is an enlarged plan view illustrating part BB of the input sensor illustrated in FIG. 5.
Figure 7:
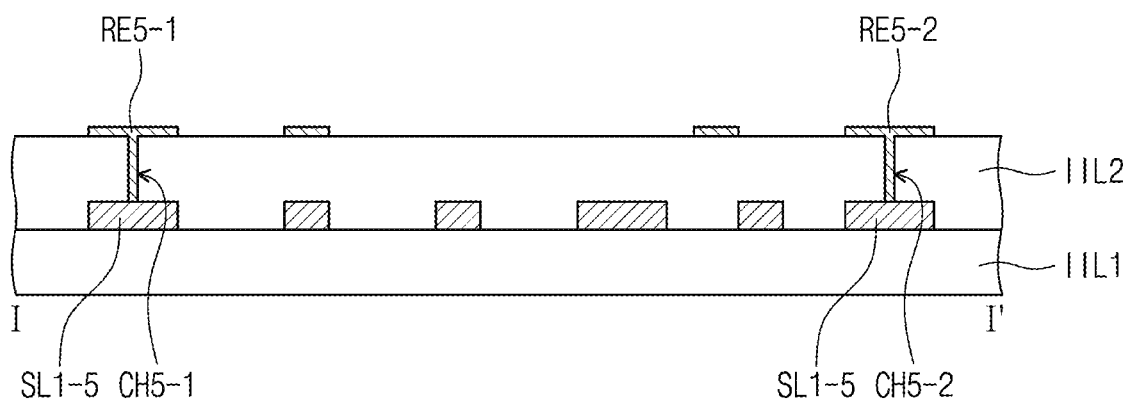
FIG. 7 is a schematic cross-sectional view along cutting line I-I' illustrated in FIG. 6.

FIG. 5 is a plan view of an input sensor according to an embodiment of the disclosure. FIG. 6 is an enlarged plan view illustrating part BB of the input sensor illustrated in FIG. 5. FIG. 7 is a schematic cross-sectional view along cutting line I-I' illustrated in FIG. 6.

Referring to FIGS. 5 to 7, the input sensor ISP may include a sensing area SA and a non-sensing area NSA adjacent to the sensing area SA. The sensing area SA and the non-sensing area NSA may be areas corresponding to a display area and a non-display area of the display panel DP (see FIG. 3), respectively. The sensing area SA may be an area that may be activated according to an electric signal. A sensing controller TIC may be disposed in the non-sensing area NSA. The sensing controller TIC may be a component included in the sensor driving portion 200C illustrated in FIG. 3.

The input sensor ISP may include multiple row sensing electrodes RE and multiple column sensing electrodes TE. The row sensing electrodes RE and the column sensing electrodes TE may be electrically insulated from each other and intersect each other.

Each of the row sensing electrodes RE may extend in the first direction DR1. The row sensing electrodes RE may be spaced apart from each other in the second direction DR2. For example, the row sensing electrodes RE may include first to fifth row sensing electrodes RE1 to RE5. It is illustrated in FIG. 5 that the number of row sensing electrodes RE may be five, but the number of row sensing electrodes RE is not limited thereto. Each of the first to fifth row sensing electrodes RE1 to RE5 may include one or more sub-row sensing electrodes. FIG. 5 illustratively illustrates a structure in which each of the first to fifth row sensing electrodes RE1 to RE5 may include two sub-row sensing electrodes, but the disclosure is not limited thereto.

As an example of the disclosure, the first row sensing electrode RE1 may include first and second sub-row sensing electrodes RE1-1 and RE1-2, and the second row sensing electrode RE2 may include third and fourth sub-row sensing electrodes RE2-1 and RE2-2. The third row sensing electrode RE3 may include fifth and sixth sub-row sensing electrodes RE3-1 and RE3-2, and the fourth row sensing electrode RE4 may include seventh and eighth sub-row sensing electrodes RE4-1 and RE4-2. The fifth row sensing electrode RE5 may include ninth and tenth sub-row sensing electrodes RE5-1 and RE5-2.

The first row sensing electrode RE1 may further include a first connection electrode RCL1 that connects the first and second sub-row sensing electrodes RE1-1 and RE1-2 to each other, and the second row sensing electrode RE2 may further include a second connection electrode RCL2 that connects the third and fourth sub-row sensing electrodes RE2-1 and RE2-2 to each other. The third row sensing electrode RE3 may further include a third connection electrode RCL3 that connects the fifth and sixth sub-row sensing electrodes RE3-1 and RE3-2 to each other, and the fourth row sensing electrode RE4 may further include a fourth connection electrode RCL4 that connects the seventh and eighth sub-row sensing electrodes RE4-1 and RE4-2 to each other. The fifth row sensing electrode RE5 may further include a fifth connection electrode RCL5 that connects the ninth and tenth sub-row sensing electrodes RE5-1 and RE5-2 to each other. As an example of the disclosure, each of the first to fifth connection electrodes RCL1 to RCL5 may be disposed in the non-sensing area NSA and electrically connected to ends of the corresponding two sub-row sensing electrodes.

Each of the first to tenth sub-row sensing electrodes RE1-1 to RE5-2 may extend in the first direction DR1. The first to tenth sub-row sensing electrodes RE1-1 to RE5-2 may be spaced apart from each other in the second direction DR2. Each of the first to tenth sub-row sensing electrodes RE1-1 to RE5-2 includes multiple sub-sensing electrodes arranged in the first direction DR1. Each of the sub-sensing electrodes may have a quadrangular shape including two horizontal sides parallel to the first direction DR1 and two vertical sides parallel to the second direction DR2. Among the sub-sensing electrodes, two adjacent sub-sensing electrodes may be electrically connected to each other through a bridge electrode BE.

Each of the column sensing electrodes TE may extend in the second direction DR2. The column sensing electrodes TE may be spaced apart from each other in the first direction DR1. For example, the column sensing electrodes TE may include first to sixth column sensing electrodes TE1 to TE6. It is illustrated in FIG. 5 that the number of column sensing electrodes TE is six, but the number of column sensing electrodes TE is not limited thereto.

Each of the first to sixth column sensing electrodes TE1 to TE6 may include an open part T_OP extending in the second direction DR2. A boundary open part T_BOP may be defined between two column sensing electrodes spaced apart from each other among the first to sixth column sensing electrodes TE1 to TE6.

As an example of the disclosure, the sub-sensing electrodes may be arranged to correspond to the open part T_OP and the boundary open part T_BOP. Hereinafter, among the sub-sensing electrodes, a sub-sensing electrode disposed to correspond to the open part T_OP may be referred to as a first sub-sensing electrode S_RE1, and a sub-sensing electrode disposed to correspond to the boundary open part T_BOP may be referred to as a second sub-sensing electrode S_RE2. As an example of the disclosure, the first and second sub-sensing electrodes S_RE1 and S_RE2 may have different shapes or different areas. However, the disclosure is not limited thereto, and for example, the first and second sub-sensing electrodes S_RE1 and S_RE2 may have the same shape or the same area.

Each of the first to sixth column sensing electrodes TE1 to TE6 may include a first sensing part TP1 and a second sensing part TP2. The first sensing part TP1 may be disposed between the first and second sub-sensing electrodes S_RE1 and S_RE2 in the first direction DR1. The second sensing part TP2 may extend from the first sensing part TP1 in the second direction DR2 and has a greater width than that of the first sensing part TP1. As an example of the disclosure, the first and second sensing parts TP1 and TP2 may be integral with each other. The bridge electrode BE may overlap the first sensing part TP1.

In an embodiment, the row sensing electrodes RE may be longer than the column sensing electrodes TE, and the number of row sensing electrodes RE may be smaller than the number of column sensing electrodes TE, but an embodiment is not limited thereto.

The input sensor ISP may acquire information on the input of the user through a change in a mutual capacitance between the row sensing electrodes RE and the column sensing electrodes TE.

The input sensor ISP may include first trace lines SL1 electrically connected to the row sensing electrodes RE and second trace lines SL2 electrically connected to the column sensing electrodes TE. At least one among the first trace lines SL1 may overlap the sensing area SA in a plan view. The second trace lines SL2 may not overlap the sensing area SA and may overlap the non-sensing area NSA.

The row sensing electrodes RE may be electrically connected to the sensing controller TIC through the first trace lines SL1, and the column sensing electrodes TE may be electrically connected to the sensing controller TIC through the second trace lines SL2. The column sensing electrodes TE may receive a transmission signal from the sensing controller TIC through the second trace lines SL2. The change in the mutual capacitance between the column sensing electrodes TE and the row sensing electrodes RE may occur at a location in which the input of the user is provided. The sensing controller TIC may generate coordinate values for the location in which the input of the user is provided, based on a reception signal received from the first trace lines SL1.

Each of the first to fifth row sensing electrodes RE1 to RE5 may be electrically connected to one or more first trace lines SL1. As an example of the disclosure, each of the first to fifth row sensing electrodes RE1 to RE5 may be electrically connected to one first trace line SL1. The first trace lines SL1 include a $(1-1)^{th}$ trace line SL1-1, a $(1-2)^{th}$ trace line SL1-2, a $(1-3)^{th}$ trace line SL1-3, a $(1-4)^{th}$ trace line SL1-4, and a $(1-5)^{th}$ trace line SL1-5 respectively electrically connected to the first to fifth row sensing electrodes RE1 to RE5. Each of the $(1-1)^{th}$ to $(1-5)^{th}$ trace lines SL1-1 to SL1-5 may extend in the second direction DR2.

It is illustrated in FIG. 5 that all the $(1-1)^{th}$ to $(1-5)^{th}$ trace lines SL1-1 to SL1-5 overlap the sensing area SA. However, the disclosure is not limited thereto. Alternatively, at least one of the $(1-1)^{th}$ to $(1-5)^{th}$ trace lines SL1-1 to SL1-5 may be disposed to overlap the non-sensing area NSA. The $(1-1)^{th}$ to $(1-5)^{th}$ trace lines SL1-1 to SL1-5 may be electrically connected to the sensing controller TIC in the non-sensing area NSA.

The $(1-1)^{th}$ trace line SL1-1 may be disposed to correspond to (or overlap) the open part T_OP of the first column sensing electrode TE1, and the $(1-2)^{th}$ trace line SL1-2 may be disposed to correspond to (or overlap) the open part T_OP of the second column sensing electrode TE2. The $(1-3)^{th}$ trace line SL1-3 may be disposed to correspond to (or overlap) the open part T_OP of the third column sensing electrode TE3, and the $(1-4)^{th}$ trace line SL1-4 may be disposed to correspond to (or overlap) the open part T_OP of the fourth column sensing electrode TE4. The $(1-5)^{th}$ trace line SL1-5 may be disposed to correspond to (or overlap) the open part T_OP of the fifth column sensing electrode TE5. Alternatively, at least one of the $(1-1)^{th}$ to $(1-5)^{th}$ trace lines SL1-1 to SL1-5 may be disposed to correspond to (or overlap) the boundary open part T_BOP.

The $(1-1)^{th}$ trace line SL1-1 may partially overlap the first to fifth row sensing electrodes RE1 to RE5 inside the open part T_OP of the first column sensing electrode TE1. The $(1-2)^{th}$ trace line SL1-2 may partially overlap the first to fifth row sensing electrodes RE1 to RE5 inside the open part T_OP of the second column sensing electrode TE2. The $(1-3)^{th}$ trace line SL1-3 may partially overlap the first to fifth row sensing electrodes RE1 to RE5 inside the open part T_OP of the third column sensing electrode TE3. The $(1-4)^{th}$ trace line SL1-4 may partially overlap the first to fifth row sensing electrodes RE1 to RE5 inside the open part T_OP of the fourth column sensing electrode TE4. The $(1-5)^{th}$ trace line SL1-5 may partially overlap the first to fifth row sensing electrodes RE1 to RE5 inside the open part T_OP of the fifth column sensing electrode TE5.

The $(1-1)^{th}$ to $(1-5)^{th}$ trace lines SL1-1 to SL1-5 may be arranged under the first to fifth row sensing electrodes RE1 to RE5 in the third direction DR3. An insulating layer (e.g., the second sensor insulating layer IIL2) (see FIG. 4) may be disposed between the $(1-1)^{th}$ to $(1-5)^{th}$ trace lines SL1-1 to SL1-5 and the first to fifth row sensing electrodes RE1 to RE5.

The first row sensing electrode RE1 may be electrically connected to the $(1-1)^{th}$ trace line SL1-1 through a first contact hole CH1. As an example of the disclosure, the first contact hole CH1 may include first and second sub-contact holes CH1-1 and CH1-2. The first sub-row sensing electrode RE1-1 of the first row sensing electrode RE1 may be electrically connected to the $(1-1)^{th}$ trace line SL1-1 through the first sub-contact hole CH1-1, and the second sub-row sensing electrode RE1-2 of the first row sensing electrode RE1 may be electrically connected to the $(1-1)^{th}$ trace line SL1-1 through the second sub-contact hole CH1-2.

The second row sensing electrode RE2 may be electrically connected to the $(1\text{-}2)^{th}$ trace line SL1-2 through a second contact hole CH2. As an example of the disclosure, the second contact hole CH2 may include third and fourth sub-contact holes CH2-1 and CH2-2. The third sub-row sensing electrode RE2-1 of the second row sensing electrode RE2 may be electrically connected to the $(1\text{-}2)^{th}$ trace line SL1-2 through the third sub-contact hole CH2-1, and the fourth sub-row sensing electrode RE2-2 of the second row sensing electrode RE2 may be electrically connected to the $(1\text{-}2)^{th}$ trace line SL1-2 through the fourth sub-contact hole CH2-2.

The third row sensing electrode RE3 may be electrically connected to the $(1\text{-}3)^{th}$ trace line SL1-3 through a third contact hole CH3. As an example of the disclosure, the third contact hole CH3 may include fifth and sixth sub-contact holes CH3-1 and CH3-2. The fifth sub-row sensing electrode RE3-1 of the third row sensing electrode RE3 may be electrically connected to the $(1\text{-}3)^{th}$ trace line SL1-3 through the fifth sub-contact hole CH3-1, and the sixth sub-row sensing electrode RE3-2 of the third row sensing electrode RE3 may be electrically connected to the $(1\text{-}3)^{th}$ trace line SL1-3 through the sixth sub-contact hole CH3-2.

The fourth row sensing electrode RE4 may be electrically connected to the $(1\text{-}4)^{th}$ trace line SL1-4 through a fourth contact hole CH4. As an example of the disclosure, the fourth contact hole CH4 may include seventh and eighth sub-contact holes CH4-1 and CH4-2. The seventh sub-row sensing electrode RE4-1 of the fourth row sensing electrode RE4 may be electrically connected to the $(1\text{-}4)^{th}$ trace line SL1-4 through the seventh sub-contact hole CH4-1, and the eighth sub-row sensing electrode RE4-2 of the fourth row sensing electrode RE4 may be electrically connected to the $(1\text{-}4)^{th}$ trace line SL1-4 through the eighth sub-contact hole CH4-2.

The fifth row sensing electrode RE5 may be electrically connected to the $(1\text{-}5)^{th}$ trace line SL1-5 through a fifth contact hole CH5. As an example of the disclosure, the fifth contact hole CH5 may include ninth and tenth sub-contact holes CH5-1 and CH5-2. The ninth sub-row sensing electrode RE5-1 of the fifth row sensing electrode RE5 may be electrically connected to the $(1\text{-}5)^{th}$ trace line SL1-5 through the ninth sub-contact hole CH5-1, and the tenth sub-row sensing electrode RE5-2 of the fifth row sensing electrode RE5 may be electrically connected to the $(1\text{-}5)^{th}$ trace line SL1-5 through the tenth sub-contact hole CH5-2.

The first to tenth sub-contact holes CH1-1 to CH5-2 may be formed to pass through the second sensor insulating layer IIL2.

The first to sixth column sensing electrodes TE1 to TE6 may be electrically connected to second trace lines SL2. Each of the first to sixth column sensing electrodes TE1 to TE6 may be electrically connected to a second trace line SL2. As an example of the disclosure, the second trace lines SL2 include a $(2\text{-}1)^{th}$ trace line SL2-1, a $(2\text{-}2)^{th}$ trace line SL2-2, a $(2\text{-}3)^{th}$ trace line SL2-3, a $(2\text{-}4)^{th}$ trace line SL2-4, a $(2\text{-}5)^{th}$ trace line SL2-5, and a $(2\text{-}6)^{th}$ trace line SL2-6, which may be electrically connected to the first to sixth column sensing electrodes TE1 to TE6, respectively. The $(2\text{-}1)^{th}$ to $(2\text{-}6)^{th}$ trace lines SL2-1 to SL2-6 may be arranged in the non-sensing area NSA and electrically connected to the sensing controller TIC in the non-sensing area NSA.

As illustrated in FIG. 6, the row sensing electrodes RE and the column sensing electrodes TE may include multiple mesh lines that intersect each other and may have a mesh shape in which multiple mesh open parts M_OP are defined by the mesh lines. The mesh open parts M_OP may respectively correspond to the light emitting areas PXA (see FIG. 4) of the pixels provided in the display panel DP.

The bridge electrode BE may be disposed under the row sensing electrodes RE and the column sensing electrodes TE in the third direction DR3. The bridge electrode BE and the $(1\text{-}1)^{th}$ to $(1\text{-}5)^{th}$ trace lines SL1-1 to SL1-5 may be arranged on the same insulating layer (e.g., the first sensor insulating layer IIL1) (see FIG. 4). The bridge electrode BE may overlap the mesh lines of the row sensing electrodes RE and/or the mesh lines of the column sensing electrodes TE in a plan view.

As an example of the disclosure, each of the $(1\text{-}1)^{th}$ to $(1\text{-}5)^{th}$ trace lines SL1-1 to SL1-5 may include multiple mesh lines that intersect each other and have a mesh shape in which the mesh open parts M_OP may be defined by the mesh lines.

In this way, sides defining each of the row sensing electrodes RE and the column sensing electrodes TE may be arranged to be parallel to the first and second directions DR1 and DR2. Thus, in case that the pen PN (see FIG. 3) moves in the first direction DR1, a capacitance with the row sensing electrodes RE may be maintained constant without changing, and as a result, a position and slope of the pen PN may be accurately sensed.

Further, in case that the first trace lines SL1 are arranged to overlap the sensing area SA, a width of the non-sensing area NSA may decrease, and as a result, a bezel width (i.e., a width of the peripheral area NAA (see FIG. 1)) of the electronic device ELD (see FIG. 1) may decrease overall.

Figure 8:
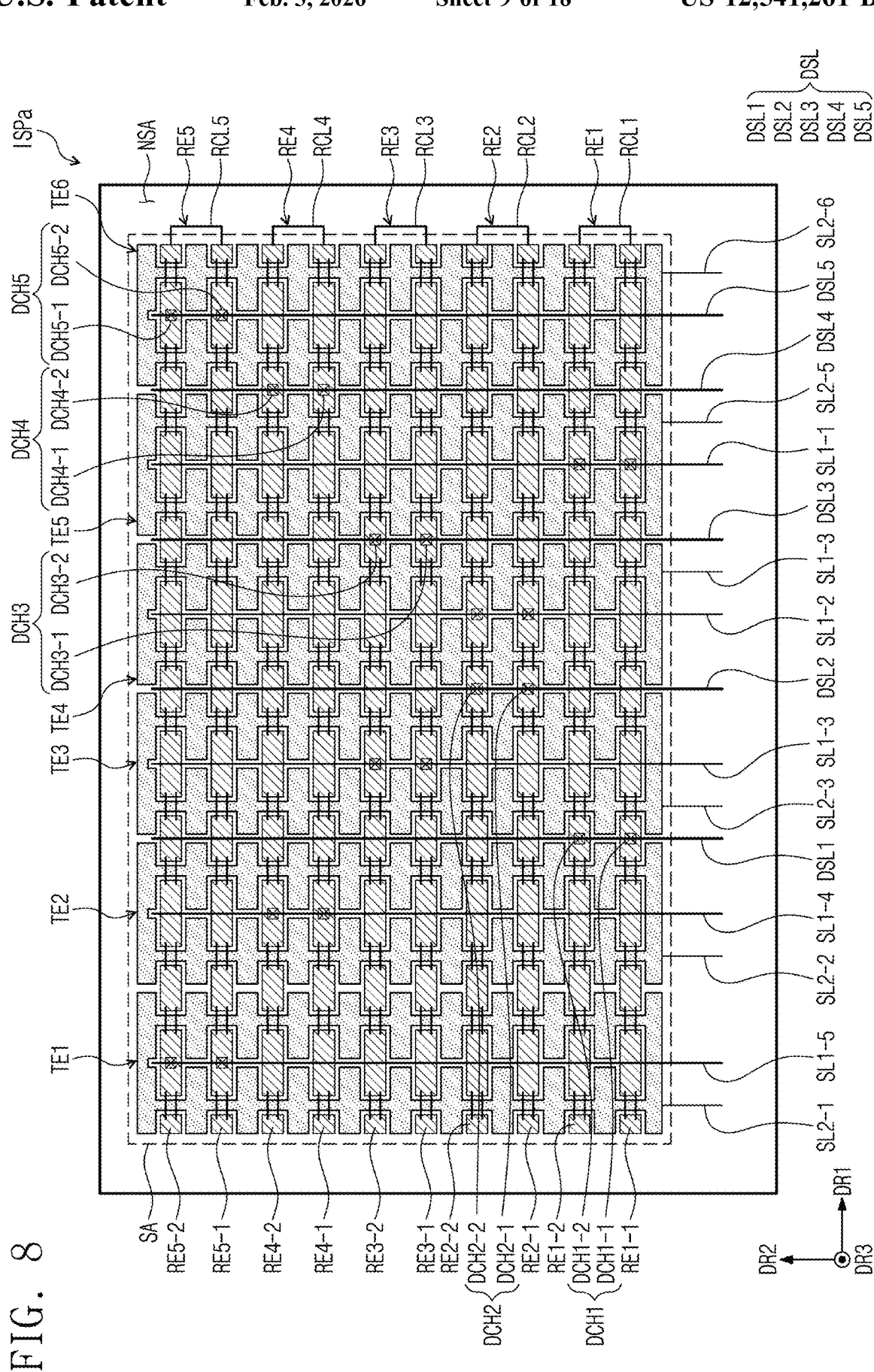
FIG. 8 is a plan view of the input sensor further including dummy trace lines according to an embodiment of the disclosure.

FIG. 8 is a plan view of the input sensor further including dummy trace lines according to an embodiment of the disclosure.

Referring to FIGS. 5 and 8, an input sensor ISPa may further include dummy trace lines DSL. As an example of the disclosure, the dummy trace lines DSL may be electrically connected to the row sensing electrodes RE. The dummy trace lines DSL may overlap the sensing area SA in a plan view.

The dummy trace lines DSL may be electrically connected to the sensing controller TIC (see FIG. 5) in the non-sensing area NSA. Thus, the row sensing electrodes RE may be electrically connected to the sensing controller TIC through the first trace lines SL1 as well as through the dummy trace lines DSL.

Each of the first to fifth row sensing electrodes RE1 to RE5 may be electrically connected to the one or more dummy trace lines DSL. As an example of the disclosure, each of the first to fifth row sensing electrodes RE1 to RE5 may be electrically connected to the one dummy trace line DSL. The dummy trace lines DSL may include a first dummy trace line DSL1, a second dummy trace line DSL2, a third dummy trace line DSL3, a fourth dummy trace line DSL4, and a fifth dummy trace line DSL5, which may be electrically connected to the first to fifth row sensing electrodes RE1 to RE5, respectively. Each of the first to fifth dummy trace lines DSL1 to DSL5 may extend in the second direction DR2.

It is illustrated in FIG. 8 that all the first to fifth dummy trace lines DSL1 to DSL5 overlap the sensing area SA. However, the disclosure is not limited thereto. Alternatively, at least one of the first to fifth dummy trace lines DSL1 to DSL5 may be disposed to overlap the non-sensing area NSA.

The first dummy trace line DLS1 may be disposed to correspond to the boundary open part T_BOP (see FIG. 6) between the second and third column sensing electrodes TE2 and TE3, and the second dummy trace line DSL2 may be disposed to correspond to the boundary open part T_BOP of the third and fourth column sensing electrodes TE3 and TE4. The third dummy trace line DSL3 may be disposed to correspond to the boundary open part T_BOP between the fourth and fifth column sensing electrodes TE4 and TE5, and the fourth dummy trace line DSL4 may be disposed to correspond to the boundary open part T_BOP of the fifth and sixth column sensing electrodes TE5 and TE6. The fifth dummy trace line DSL5 may be disposed to correspond to the open part T_OP of the sixth column sensing electrode TE6.

The first to fifth dummy trace lines DLS1 to DSL5 may be arranged under the first to fifth row sensing electrodes RE1 to RE5 in the third direction DR3. An insulating layer (e.g., the second sensor insulating layer IIL2) (see FIG. 4) may be disposed between the first to fifth dummy trace lines DLS1 to DSL5 and the first to fifth row sensing electrodes RE1 to RE5.

The first row sensing electrode RE1 may be electrically connected to the first dummy trace line DLS1 through a first dummy contact hole DCH1. As an example of the disclosure, the first dummy contact hole DCH1 may include first and second sub-dummy contact holes DCH1-1 and DCH1-2. The first sub-row sensing electrode RE1-1 of the first row sensing electrode RE1 may be electrically connected to the first dummy trace line DSL1 through the first sub-dummy contact hole DCH1-1, and the second sub-row sensing electrode RE1-2 of the first row sensing electrode RE1 may be electrically connected to the first dummy trace line DLS1 through the second sub-dummy contact hole DCH1-2.

The second row sensing electrode RE2 may be electrically connected to the second dummy trace line DSL2 through a second dummy contact hole DCH2. As an example of the disclosure, the second dummy contact hole DCH2 may include third and fourth sub-dummy contact holes DCH2-1 and DCH2-2. The third sub-row sensing electrode RE2-1 of the second row sensing electrode RE2 may be electrically connected to the second dummy trace line DSL2 through the third sub-dummy contact hole DCH2-1, and the fourth sub-row sensing electrode RE2-2 of the second row sensing electrode RE2 may be electrically connected to the second dummy trace line DSL2 through the fourth sub-dummy contact hole DCH2-2.

The third row sensing electrode RE3 may be electrically connected to the third dummy trace line DSL3 through a third dummy contact hole DCH3. As an example of the disclosure, the third dummy contact hole DCH3 may include fifth and sixth sub-dummy contact holes DCH3-1 and DCH3-2. The fifth sub-row sensing electrode RE3-1 of the third row sensing electrode RE3 may be electrically connected to the third dummy trace line DSL3 through the fifth sub-dummy contact hole DCH3-1, and the sixth sub-row sensing electrode RE3-2 of the third row sensing electrode RE3 may be electrically connected to the third dummy trace line DSL3 through the sixth sub-dummy contact hole DCH3-2.

The fourth row sensing electrode RE4 may be electrically connected to the fourth dummy trace line DSL4 through a fourth dummy contact hole DCH4. As an example of the disclosure, the fourth dummy contact hole DCH4 may include seventh and eighth sub-dummy contact holes DCH4-1 and DCH4-2. The seventh sub-row sensing electrode RE4-1 of the fourth row sensing electrode RE4 may be electrically connected to the fourth dummy trace line DSL4 through the seventh sub-dummy contact hole DCH4-1, and the eighth sub-row sensing electrode RE4-2 of the fourth row sensing electrode RE4 may be electrically connected to the fourth dummy trace line DSL4 through the eighth sub-dummy contact hole DCH4-2.

The fifth row sensing electrode RE5 may be electrically connected to the fifth dummy trace line DSL5 through a fifth dummy contact hole DCH5. As an example of the disclosure, the fifth dummy contact hole DCH5 may include ninth and tenth sub-dummy contact holes DCH5-1 and DCH5-2. The ninth sub-row sensing electrode RE5-1 of the fifth row sensing electrode RE5 may be electrically connected to the fifth dummy trace line DSL5 through the ninth sub-dummy contact hole DCH5-1, and the tenth sub-row sensing electrode RE5-2 of the fifth row sensing electrode RE5 may be electrically connected to the fifth dummy trace line DSL5 through the tenth sub-dummy contact hole DCH5-2.

The first to tenth sub-dummy contact holes DCH1-1 to DCH5-2 may be formed to pass through the second sensor insulating layer IIL2.

The sensing controller TIC may detect a touch input based on a reception signal received through the first trace lines SL1 and a dummy reception signal received through the dummy trace lines DSL. For example, the sensing controller TIC may recognize the touch input as a normal touch only in case that both the reception signal and the dummy reception signal are different from a preset reference value. However, in case that only one of the reception signal and the dummy reception signal is different from the reference value, the sensing controller TIC may recognize the touch input as an abnormal touch (e.g., a ghost touch). In this way, the sensing controller TIC may further receive the dummy reception signal through the dummy trace lines DSL, and thus sensing accuracy of the electronic device ELD (see FIG. 1) for an external input (particularly, the touch input) may be improved.

Figure 9:
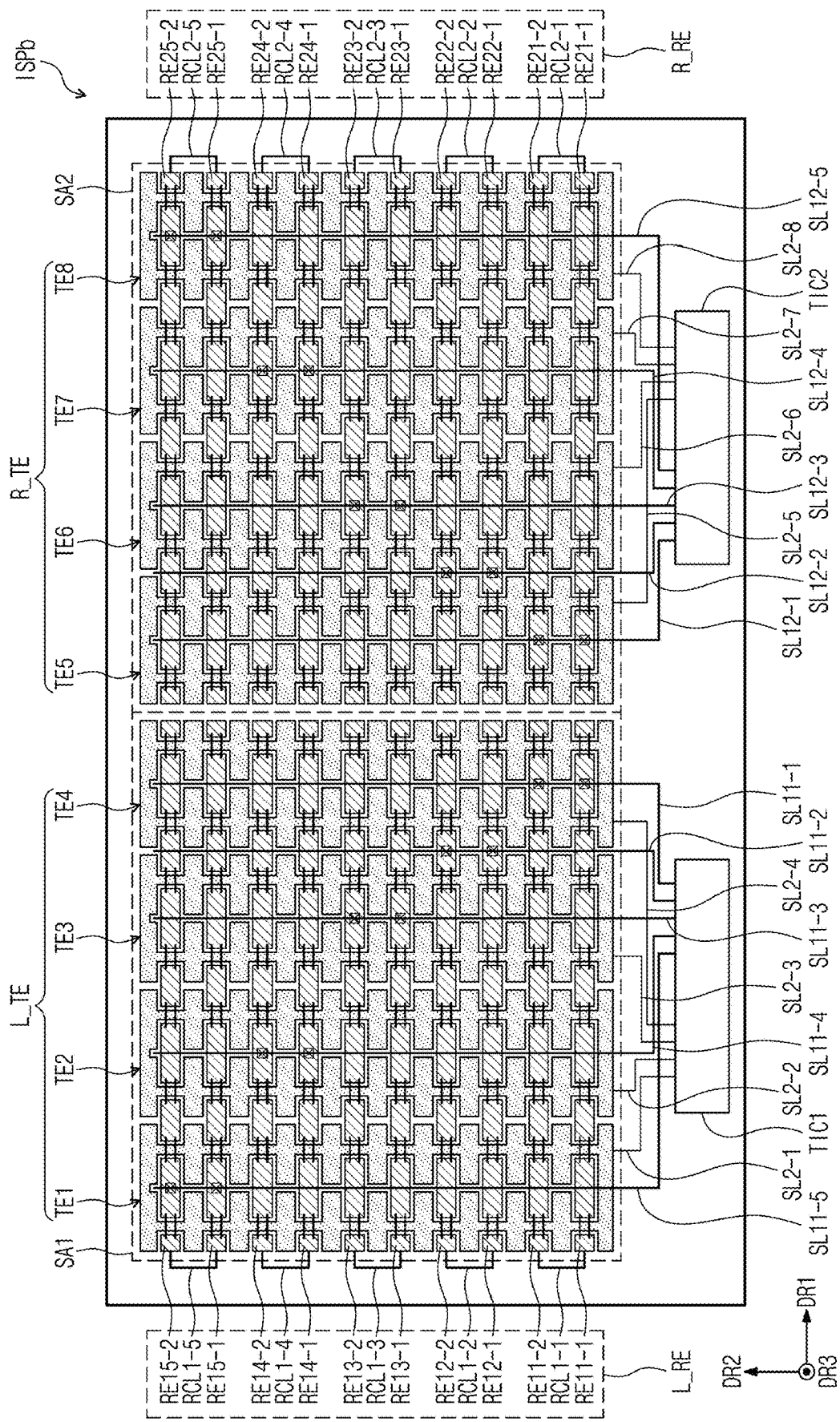
FIG. 9 is a plan view of the input sensor including first and second sub-sensing areas according to an embodiment of the disclosure.

FIG. 9 is a plan view of the input sensor including first and second sub-sensing areas according to an embodiment of the disclosure.

Referring to FIG. 9, an input sensor ISPb may include a first sub-sensing area SA1, a second sub-sensing area SA2, and the non-sensing area NSA. The first and second sub-sensing areas SA1 and SA2 may be arranged adjacent to each other in the first direction DR1.

The input sensor ISPb may include multiple first side row sensing electrodes L_RE, multiple first side column sensing electrodes L_TE, multiple second side row sensing electrodes R_RE, and multiple second side column sensing electrodes R_TE. The first side row sensing electrodes L_RE and the first side column sensing electrodes L_TE may be arranged in the first sub-sensing area SA1, and the second side row sensing electrodes R_RE and the second side column sensing electrodes R_TE may be arranged in the second sub-sensing area SA2. The first side row sensing electrodes L_RE may be spaced apart from the second side row sensing electrodes R_RE in the first direction DR1.

The first side row sensing electrodes L_RE may include first to tenth sub-row sensing electrodes RE11-1 to RE15-2, and the second side row sensing electrodes R_RE may include $11^{th}$ to $20^{th}$ sub-row sensing electrodes RE21-1 to RE25-2. The first to tenth sub-row sensing electrodes RE11-1 to RE15-2 may extend in the first direction DR1 and may be arranged in the second direction DR2. The first and second sub-row sensing electrodes RE11-1 and RE11-2 may be electrically connected to each other by a first connection electrode RCL1-1, and the third and fourth sub-row sensing electrodes RE12-1 and RE12-2 may be electrically connected to each other by a second connection electrode RCL1-2. The fifth and sixth sub-row sensing electrodes RE13-1 and RE13-2 may be electrically connected to each other by a third connection electrode RCL1-3, and the seventh and eighth sub-row sensing electrodes RE14-1 and RE14-2 may be electrically connected to each other by a fourth connection electrode RCL1-4. The ninth and tenth sub-row sensing electrodes RE15-1 and RE15-2 may be electrically connected to each other by a fifth connection electrode RCL1-5, and the $11^{th}$ and $12^{th}$ sub-row sensing electrodes RE21-1 and RE22-2 may be electrically connected to each other by a sixth connection electrode RCL2-1. The $13^{th}$ and $14^{th}$ sub-row sensing electrodes RE22-1 and RE22-2 may be electrically connected to each other by a seventh connection electrode RCL2-2, and the $15^{th}$ and $16^{th}$ sub-row sensing electrodes RE23-1 and RE23-2 may be electrically connected to each other by an eighth connection electrode RCL2-3. The $17^{th}$ and $18^{th}$ sub-row sensing electrodes RE24-1 and RE24-2 may be electrically connected to each other by a ninth connection electrode RCL2-4, and the $19^{th}$ and $20^{th}$ sub-row sensing electrodes RE25-1 and RE25-2 may be electrically connected to each other by a tenth connection electrode RCL2-5.

The first side column sensing electrodes L_TE include the first to fourth column sensing electrodes TE1 to TE4, and the second side column sensing electrodes R_TE include the fifth to eighth column sensing electrodes TE5 to TE8. The first to eighth column sensing electrodes TE1 to TE8 may extend in the second direction DR2 and may be arranged in the first direction DR1. The open part T_OP (see FIG. 6) extending in the second direction DR2 may be defined in each of the first to eighth column sensing electrodes TE1 to TE8, and the boundary open part T_BOP (see FIG. 6) may be defined between two column sensing electrodes spaced apart from each other among the first to eighth column sensing electrodes TE1 to TE8. First to fourth column sensing electrodes TE1 to TE4 are electrically connected to first sensing controller TIC1 by $(2-1)^{th}$ to $(2-4)^{th}$ trace lines SL2-1 to SL2-4 respectively, while fifth to eighth column sensing electrodes TE5 to TE8 are electrically connected to second sensing controller TIC2 by $(2-5)^{th}$ to $(2-8)^{th}$ trace lines SL2-5 to SL2-8 respectively First and second sensing controllers TIC1 and TIC2 may be arranged in the non-sensing area NSA. As an example of the disclosure, the first sensing controller TIC1 may be electrically connected to the first side row sensing electrodes L_RE and the first side column sensing electrodes L_TE, and the second sensing controller TIC2 may be electrically connected to the second side row sensing electrodes R_RE and the second side column sensing electrodes R_TE.

The first side row sensing electrodes L_RE may be electrically connected to the first sensing controller TIC1 by $(1-1)^{th}$ side trace lines SL11-1 to SL11-5, and the second side row sensing electrodes R_RE may be electrically connected to the second sensing controller TIC2 by $(1-2)^{th}$ side trace lines SL12-1 to SL12-5. The $(1-1)^{th}$ side trace lines SL11-1 to SL11-5 overlap the first sub-sensing area SA1, and the $(1-2)^{th}$ side trace lines SL12-1 to SL12-5 overlap the second sub-sensing area SA2.

The $(1-1)^{th}$ side trace lines SL11-1 to SL11-5 may be arranged to correspond to (or overlap) the open part T_OP defined inside the first side column sensing electrodes L_TE in the first sub-sensing area SA1 or the boundary open part T_BOP defined between the first side column sensing electrodes L_TE. The $(1-2)^{th}$ side trace lines SL12-1 to SL12-5 may be arranged to correspond to (or overlap) the open part T_OP defined inside the second side column sensing electrodes R_TE in the second sub-sensing area SA2 or the boundary open part T_BOP defined between the second side column sensing electrodes R_TE.

Figure 10:
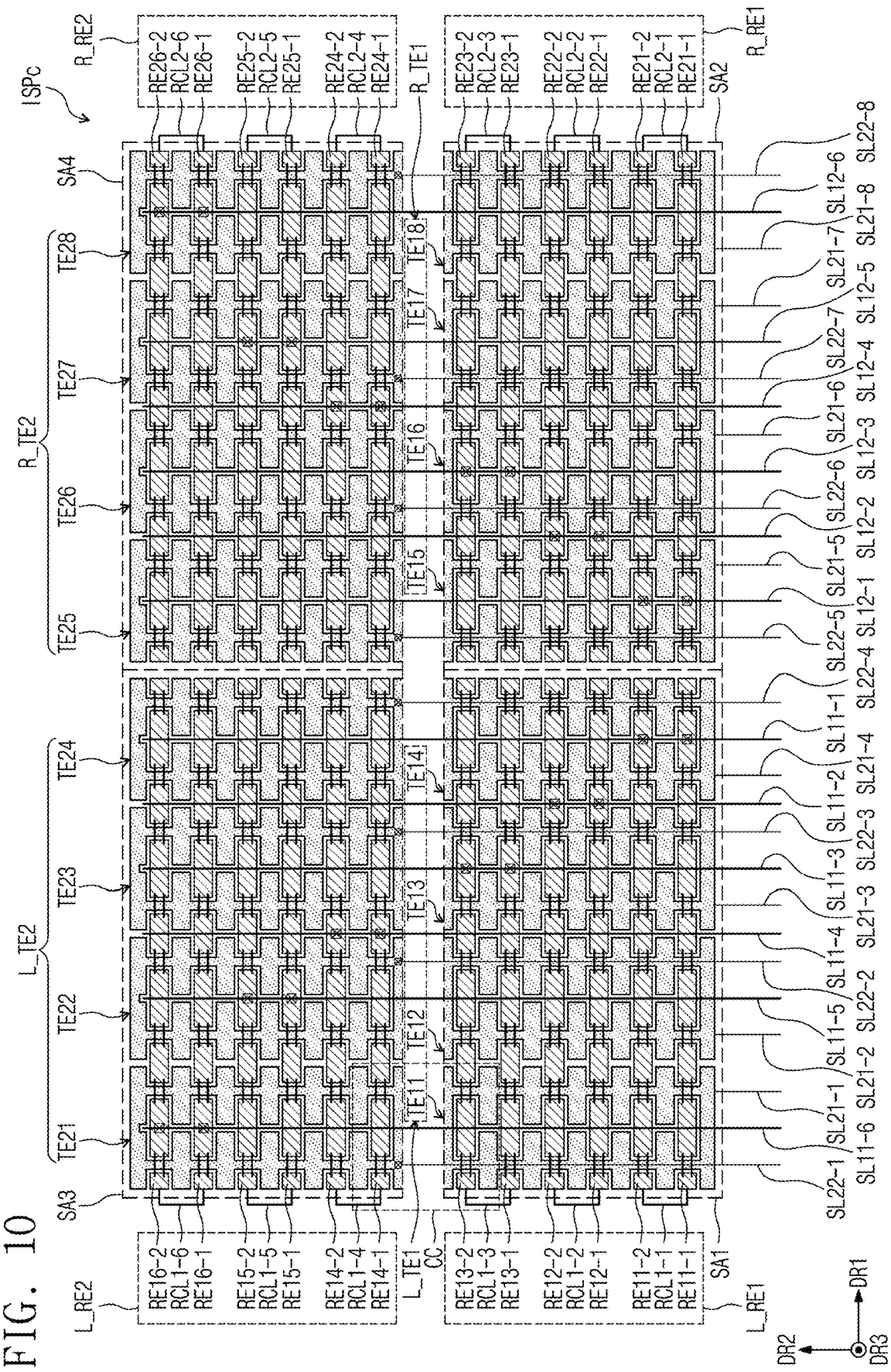
FIG. 10 is a plan view of the input sensor including first to fourth sub-sensing areas according to an embodiment of the disclosure.
Figure 11A:
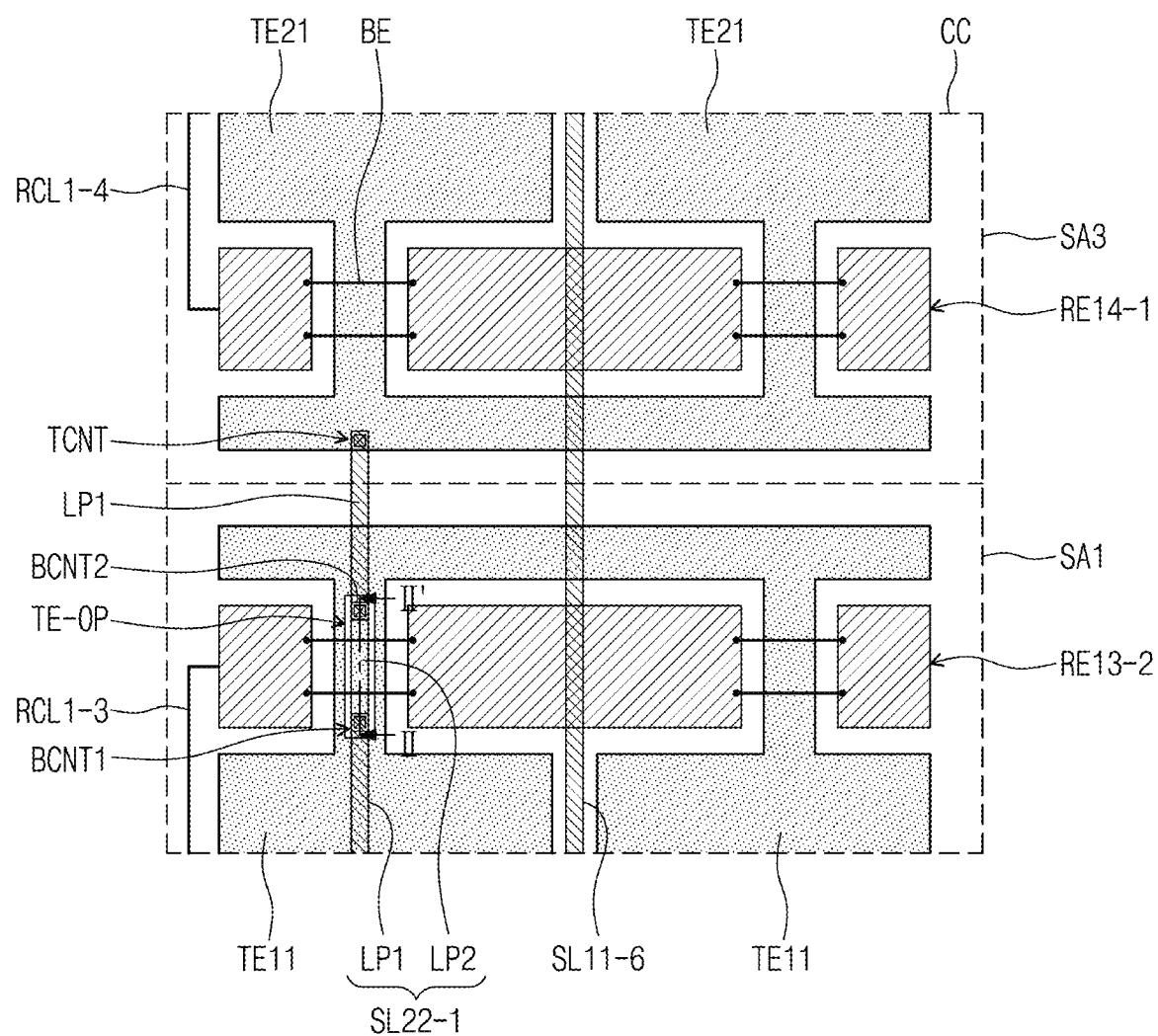
FIG. 11A is an enlarged plan view illustrating part CC of the input sensor illustrated in FIG. 10.
Figure 11B:
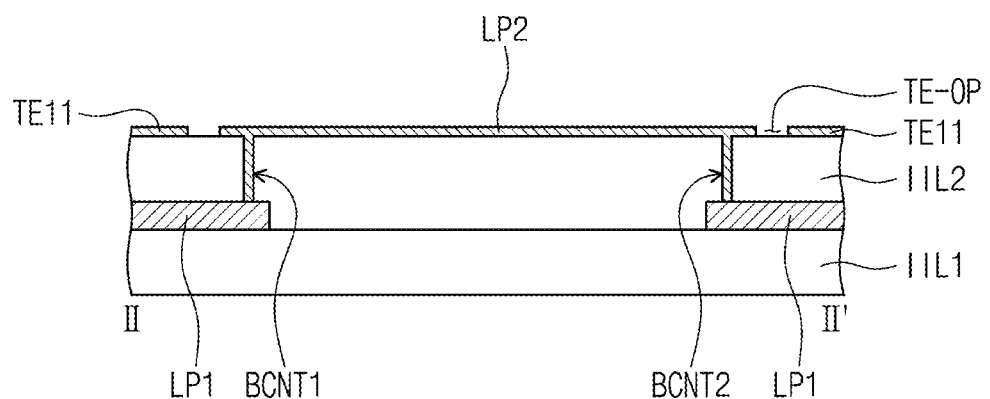
FIG. 11B is a schematic cross-sectional view along cutting line II-II' illustrated in FIG. 11A.

FIG. 10 is a plan view of the input sensor including first to fourth sub-sensing areas according to an embodiment of the disclosure. FIG. 11A is an enlarged plan view illustrating part CC of the input sensor illustrated in FIG. 10, and FIG. 11B is a schematic cross-sectional view along cutting line II-II' illustrated in FIG. 11A.

Referring to FIG. 10, an input sensor ISPc may include the first sub-sensing area SA1, the second sub-sensing area SA2, a third sub-sensing area SA3, a fourth sub-sensing area SA4, and the non-sensing area NSA. The first and second sub-sensing areas SA1 and SA2 may be arranged adjacent to each other in the first direction DR1, and the third and fourth sub-sensing areas SA3 and SA4 may be arranged adjacent to each other in the first direction DR1. The first and third sub-sensing areas SA1 and SA3 may be arranged adjacent to each other in the second direction DR2, and the second and fourth sub-sensing areas SA2 and SA4 may be arranged adjacent to each other in the second direction DR2.

The input sensor ISPc may include multiple $(1-1)^{th}$ side row sensing electrodes L_RE1, multiple $(1-1)^{th}$ side column sensing electrodes L_TE1, multiple $(2-1)^{th}$ side row sensing electrodes R_RE1, multiple $(2-1)^{th}$ side column sensing electrodes R_TE1, multiple $(1-2)^{th}$ side row sensing electrodes L_RE2, multiple $(1-2)^{th}$ side column sensing electrodes L_TE2, multiple $(2-2)^{th}$ side row sensing electrodes R_RE2, and multiple $(2-2)^{th}$ side column sensing electrodes R_TE2. The $(1-1)^{th}$ side row sensing electrodes L_RE1 and the $(1-1)^{th}$ side column sensing electrodes L_TE1 may be arranged in the first sub-sensing area SA1, and the $(2-1)^{th}$ side row sensing electrodes R_RE1 and the $(2-1)^{th}$ side column sensing electrodes R_TE1 may be arranged in the second sub-sensing area SA2. The $(1-2)^{th}$ side row sensing electrodes L_RE2 and the $(1-2)^{th}$ side column sensing electrodes L_TE2 may be arranged in the third sub-sensing area SA3, and the $(2-2)^{th}$ side row sensing electrodes R_RE2 and the $(2-2)^{th}$ side column sensing electrodes R_TE2 may be arranged in the fourth sub-sensing area SA4.

The $(1-1)^{th}$ side row sensing electrodes L_RE1 include the first to sixth sub-row sensing electrodes RE11-1 to RE13-2 and the first to third connection electrodes RCL1-1, RCL1-2, and RCL1-3, and the $(1-2)^{th}$ side row sensing electrodes L_RE2 include the seventh to $12^{th}$ sub-row sensing electrodes RE14-1 to RE16-2 and the fourth to sixth connection electrodes RCL1-4, RCL1-5, and RCL1-6. The $(2-1)^{th}$ side row sensing electrodes R_RE1 include $13^{th}$ to $18^{th}$ sub-row sensing electrodes RE21-1 to RE23-2 and the seventh to ninth connection electrodes RCL2-1, RCL2-2, and RCL2-3, and the $(2-2)^{th}$ side row sensing electrodes R_RE2 include $19^{th}$ to $24^{th}$ sub-row sensing electrodes RE24-1 to RE26-2 and $10^{th}$ to $12^{th}$ connection electrodes RCL2-4, RCL2-5, and RCL2-6.

The first to $24^{th}$ sub-row sensing electrodes RE11-1 to RE26-2 may extend in the first direction DR1 and may be arranged in the second direction DR2.

The $(1-1)^{th}$ side column sensing electrodes L_TE1 include first to fourth column sensing electrodes TE11 to TE14, and the $(2-1)^{th}$ side column sensing electrodes R_TE1 include fifth to eighth column sensing electrodes TE15 to TE18. The $(1-2)^{th}$ side column sensing electrodes L_TE2 include ninth to $12^{th}$ column sensing electrodes TE21 to TE24, and the $(2-2)^{th}$ side column sensing electrodes R_TE2 include $13^{th}$ to $16^{th}$ column sensing electrodes TE25 to TE28.

The first to $16^{th}$ column sensing electrodes TE11 to TE18 and TE21 to TE28 may extend in the second direction DR2 and may be arranged in the first direction DR1. The open part T_OP (see FIG. 6) extending in the second direction DR2 may be defined in each of the first to $16^{th}$ column sensing electrodes TE11 to TE18 and TE21 to TE28, and the boundary open part T_BOP (see FIG. 6) may be defined between two column sensing electrodes spaced apart from each other among the first to $16^{th}$ column sensing electrodes TE11 to TE18 and TE21 to TE28.

The first and second sensing controllers TIC1 and TIC2 (see FIG. 9) may be arranged in the non-sensing area NSA. As an example of the disclosure, the first sensing controller TIC1 may be electrically connected to the $(1-1)^{th}$ side row sensing electrodes L_RE1, the $(1-2)^{th}$ side row sensing electrodes L_RE2, the $(1-1)^{th}$ side column sensing electrodes L_TE1, and the $(1-2)^{th}$ side column sensing electrodes L_TE2. The second sensing controller TIC2 may be electrically connected to the $(2-1)^{th}$ side row sensing electrodes R_RE1, the $(2-2)^{th}$ side row sensing electrodes R_RE2, the $(2-1)^{th}$ side column sensing electrodes R_TE1, and the $(2-2)^{th}$ side column sensing electrodes R_TE2.

The $(1-1)^{th}$ side row sensing electrodes L_RE1 and the $(1-2)^{th}$ side row sensing electrodes L_RE2 may be electrically connected to the first sensing controller TIC1 by the $(1-1)^{th}$ side trace lines SL11-1 to SL11-6. The $(2-1)^{th}$ side row sensing electrodes R_RE1 and the $(2-2)^{th}$ side row sensing electrodes R_RE2 may be electrically connected to the second sensing controller TIC2 by the $(1-2)^{th}$ side trace lines SL12-1 to SL12-6. The $(1-1)^{th}$ side trace lines SL11-1 to SL11-6 may overlap the first and third sub-sensing areas SA1 and SA3, and the $(1-2)^{th}$ side trace lines SL12-1 to SL12-6 may overlap the second and fourth sub-sensing areas SA2 and SA4.

The $(1-1)^{th}$ side trace lines SL11-1 to SL11-6 may be arranged to correspond to (or overlap) the open part T_OP (see FIG. 6) defined inside the $(1-1)^{th}$ side column sensing electrodes L_TE1 in the first sub-sensing area SA1 or the boundary open part T_BOP (see FIG. 6) defined between the $(1-1)^{th}$ side column sensing electrodes L_TE1. The $(1-1)^{th}$ side trace lines SL11-1 to SL11-6 may be arranged to correspond to (or overlap) the open part T_OP defined inside the $(1-2)^{th}$ side column sensing electrodes L_TE2 in the third sub-sensing area SA3 or the boundary open part T_BOP defined between the $(1-2)^{th}$ side column sensing electrodes L_TE2.

The $(1-2)^{th}$ side trace lines SL12-1 to SL12-6 may be arranged to correspond to (or overlap) the open part T_OP defined inside the $(2-1)^{th}$ side column sensing electrodes R_TE1 in the second sub-sensing area SA2 or the boundary open part T_BOP defined between the $(2-1)^{th}$ side column sensing electrodes R_TE1. The $(1-2)^{th}$ side trace lines SL12-1 to SL12-6 may be arranged to correspond to (or overlap) the open part T_OP defined inside the $(2-2)^{th}$ side column sensing electrodes R_TE2 in the fourth sub-sensing area SA4 or the boundary open part T_BOP defined between the $(2-2)^{th}$ side column sensing electrodes R_TE2.

The $(1-1)^{th}$ side column sensing electrodes L_TE1 may be electrically connected to the first sensing controller TIC1 by $(2-1)^{th}$ to $(2-4)^{th}$ trace lines SL21-1 to SL21-4. The $(2-1)^{th}$ side column sensing electrodes R_TE1 may be electrically connected to the second sensing controller TIC2 by $(2-5)^{th}$ to $(2-8)^{th}$ trace lines SL21-5 to SL21-8. The $(1-2)^{th}$ side column sensing electrodes L_TE2 may be electrically connected to the first sensing controller TIC1 by $(2-9)^{th}$ to $(2-12)^{th}$ trace lines SL22-1 to SL22-4. The $(2-2)^{th}$ side column sensing electrodes R_TE2 may be electrically connected to the second sensing controller TIC2 by $(2-13)^{th}$ to $(2-16)^{th}$ trace lines SL22-5 to SL22-8. The $(2-1)^{th}$ to $(2-4)^{th}$ trace lines SL21-1 to SL21-4 may be referred to as $(2-1)^{th}$ side trace lines, and the $(2-5)^{th}$ to $(2-8)^{th}$ trace lines SL21-5 to SL21-8 may be referred to as $(2-2)^{th}$ side trace lines. The $(2-9)^{th}$ to $(2-12)^{th}$ trace lines SL22-1 to SL22-4 may be referred to as $(2-3)^{th}$ side trace lines, and the $(2-13)^{th}$ to $(2-16)^{th}$ trace lines SL22-5 to SL22-8 may be referred to as $(2-4)^{th}$ side trace lines.

The $(2-1)^{th}$ to $(2-8)^{th}$ trace lines SL21-1 to SL21-8 may be electrically connected to the first to eighth column sensing electrodes TE11 to TE18, respectively, and the $(2-9)^{th}$ to $(2-16)^{th}$ trace lines SL22-1 to SL22-8 may be electrically connected to the ninth to $16^{th}$ column sensing electrodes TE21 to TE28, respectively. The $(2-1)^{th}$ to $(2-8)^{th}$ trace lines SL21-1 to SL21-8 may be arranged in the non-sensing area NSA and do not overlap the first and second sub-sensing areas SA1 and SA2. The $(2-9)^{th}$ to $(2-16)^{th}$ trace lines SL22-1 to SL22-8 overlap the non-sensing area NSA and the first to fourth sub-sensing areas SA1, SA2, SA3, and SA4.

The $(2-9)^{th}$ to $(2-12)^{th}$ trace lines SL22-1 to SL22-4 may extend to the third sub-sensing area SA3 via the non-sensing area NSA and the first sub-sensing area SA1. The $(2-13)^{th}$ to $(2-16)^{th}$ trace lines SL22-5 to SL22-8 may extend to the fourth sub-sensing area SA4 via the non-sensing area NSA and the second sub-sensing area SA2. In the disclosure, the $(2-9)^{th}$ to $(2-12)^{th}$ trace lines SL22-1 to SL22-4 may overlap the ninth to $12^{th}$ column sensing electrodes TE21 to TE24 arranged in the first sub-sensing area SA1. The $(2-13)^{th}$ to $(2-16)^{th}$ trace lines SL22-5 to SL22-8 may overlap the $13^{th}$ to $16^{th}$ column sensing electrodes TE25 to TE28 arranged in the second sub-sensing area SA2. Each of the $(2-9)^{th}$ to $(2-16)^{th}$ trace lines SL22-1 to SL22-8 may include a first line part LP1 and a second line part LP2. The first and second line parts LP1 and LP2 may be electrically connected to each other and may be arranged on different layers.

Referring to FIGS. 10, 11A, and 11B, the $(2-9)^{th}$ trace line SL22-1 overlaps the first column sensing electrode TE11 disposed in the first sub-sensing area SA1 and may be electrically connected to the ninth column sensing electrode TE21 in the third sub-sensing area SA3 through contact hole TCNT. The first line part LP1 of the $(2-9)^{th}$ trace line SL22-1 may be disposed under the first and ninth column sensing electrodes TE11 and TE21 in the third direction DR3. The first line part LP1 of the $(2-9)^{th}$ trace line SL22-1 and the $(1-1)^{th}$ side trace lines SL11-1 to SL11-6 may be arranged on the same insulating layer (e.g., the first sensor insulating layer IIL1).

The first line part LP1 of the $(2-9)^{th}$ trace line SL22-1 and the $(1-1)^{th}$ side trace lines SL11-1 to SL11-6 may be covered by the second sensor insulating layer IIL2. The second line part LP2 of the $(2-9)^{th}$ trace line SL22-1 and the first and ninth column sensing electrodes TE11 and TE21 may be arranged on the second sensor insulating layer IIL2. The second sensor insulating layer IIL2 may be provided with first and second line contact holes BCNT1 and BCNT2 through which the first line part LP1 of the $(2-9)^{th}$ trace line SL22-1 may be exposed. The second line part LP2 of the $(2-9)^{th}$ trace line SL22-1 may be electrically connected to the first line part LP1 of the $(2-9)^{th}$ trace line SL22-1 through first and second line contact holes BCNT1 and BCNT2.

The first column sensing electrode TE11 may be provided with a line open part TE-OP to correspond to the second line part LP2 of the $(2-9)^{th}$ trace line SL22-1. The first column sensing electrode TE11 and the second line part LP2 of the $(2-9)^{th}$ trace line SL22-1 may be spaced apart from each other by the line open part TE-OP. Thus, the first column sensing electrode TE11 and the second line part LP2 of the $(2-9)^{th}$ trace line SL22-1 may be electrically isolated from each other even in case that the first column sensing electrode TE11 and the second line part LP2 are arranged on a same layer.

FIG. 10 illustratively illustrates a structure in which the $(2-9)^{th}$ to $(2-16)^{th}$ trace lines SL22-1 to SL22-8 overlap the first or second sub-sensing area SA1 or SA2, but the disclosure is not limited thereto. For example, the $(2-9)^{th}$ to $(2-16)^{th}$ trace lines SL22-1 to SL22-8 may not overlap the first or second sub-sensing area SA1 or SA2 and may be arranged only in the non-sensing area NSA. However, in case that the $(2-9)^{th}$ to $(2-16)^{th}$ trace lines SL22-1 to SL22-8 are arranged to overlap the first or second sub-sensing area SA1 or SA2, a width of the non-sensing area NSA may be reduced, and as a result, the bezel width (i.e., the peripheral area NAA) (see FIG. 1) of the electronic device ELD (see FIG. 1) may be overall reduced.

Figure 12:
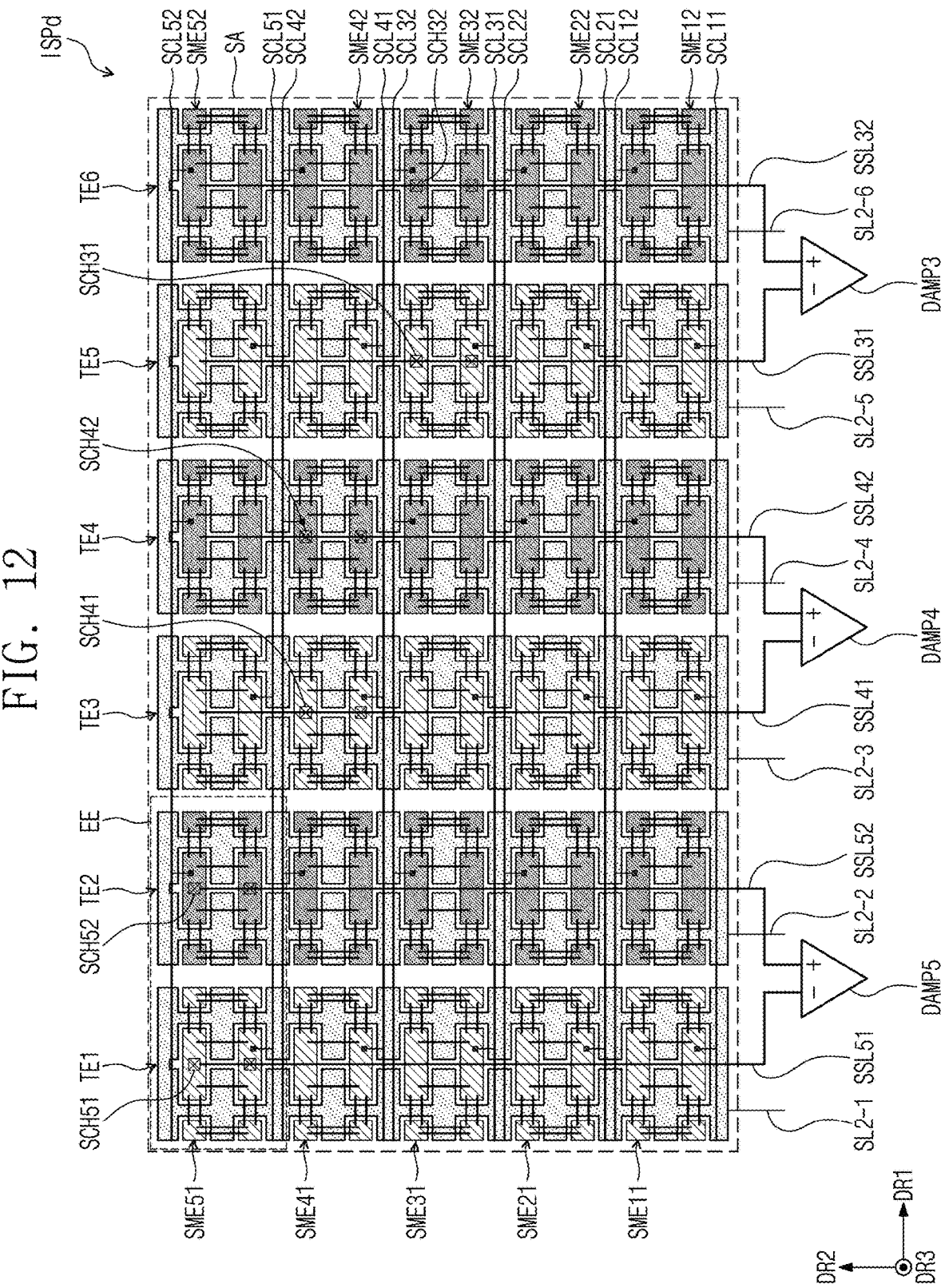
FIG. 12 is a plan view illustrating row sensing electrodes driven by a differential driving method according to an embodiment of the disclosure.
Figure 13A:
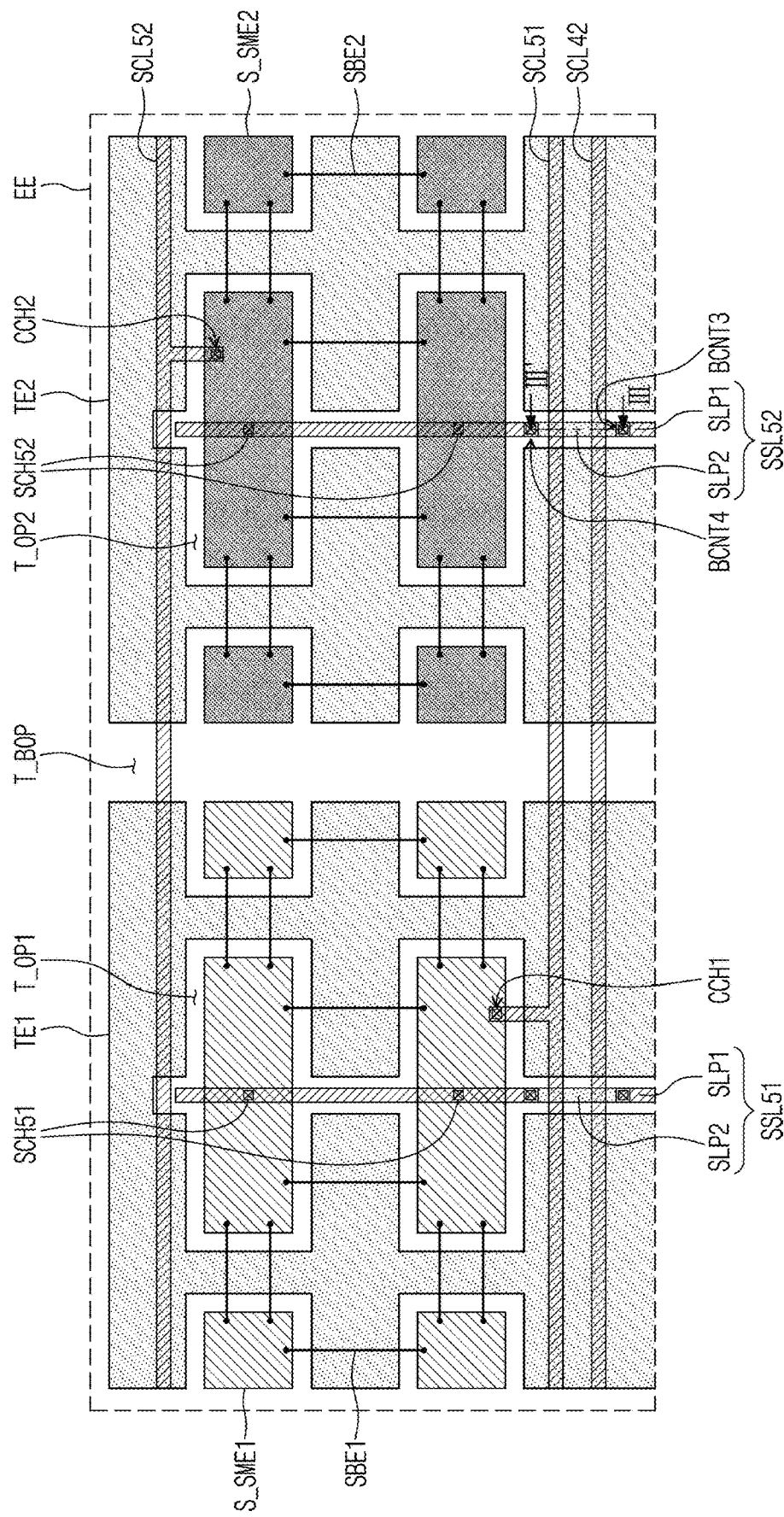
FIG. 13A is an enlarged plan view illustrating part EE of the input sensor illustrated in FIG. 12.
Figure 13B:
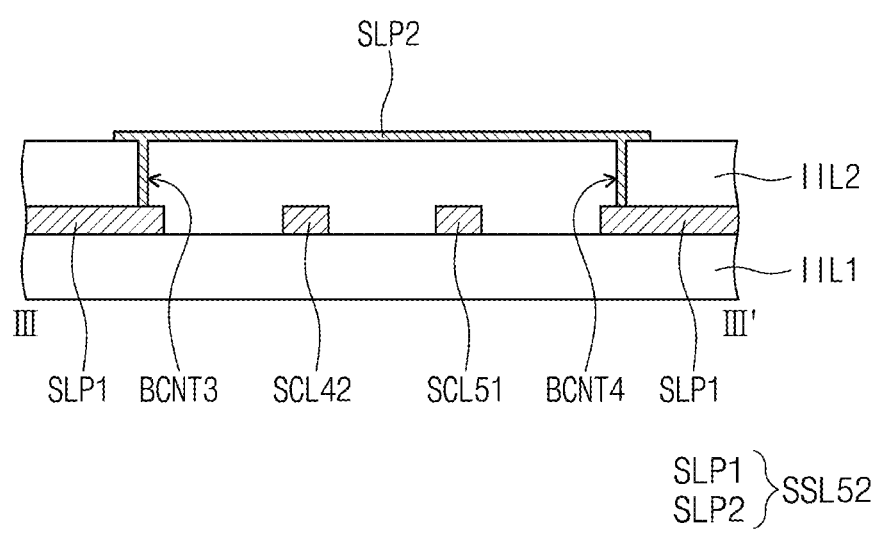
FIG. 13B is a schematic cross-sectional view along cutting line III-III' illustrated in FIG. 13A.

FIG. 12 is a plan view illustrating row sensing electrodes driven by a differential driving method according to an embodiment of the disclosure. FIG. 13A is an enlarged plan view illustrating part EE of the input sensor illustrated in FIG. 12. FIG. 13B is a schematic cross-sectional view along cutting line III-III' illustrated in FIG. 13A.

Referring to FIGS. 12 to 13B, an input sensor ISPd may include first segment sensing electrodes SME11, SME21, SME31, SME41, and SME51, second segment sensing electrodes SME12, SME22, SME32, SME42, and SME52, and the column sensing electrodes TE1 to TE6.

Each of the column sensing electrodes TE1 to TE6 may extend in the second direction DR2. The column sensing electrodes TE may be spaced apart from each other in the first direction DR1. For example, the column sensing electrodes TE1 to TE6 may include the first to sixth column sensing electrodes TE1 to TE6. It is illustrated in FIG. 12 that the number of column sensing electrodes TE1 to TE6 may be six, but the number of column sensing electrodes TE1 to TE6 is not limited thereto.

Each of the first to sixth column sensing electrodes TE1 to TE6 may include open parts T_OP1 and T_OP2 extending in the second direction DR2. The boundary open part T_BOP may be defined between two column sensing electrodes spaced apart from each other among the first to sixth column sensing electrodes TE1 to TE6. For convenience of description, among the first to sixth column sensing electrodes TE1 to TE6, the open part defined in each of the odd-numbered column sensing electrodes TE1, TE3, and TE5 may be referred to as a first open part T_OP1, and the open part defined in each of the even-numbered column sensing electrodes TE2, TE4, and TE6 may be referred to as a second open part T_OP2.

The first segment sensing electrodes SME11, SME21, SME31, SME41, and SME51 include the $(1-1)^{th}$ segment sensing electrodes SME11, the $(1-2)^{th}$ segment sensing electrodes SME21, and the $(1-3)^{th}$ segment sensing electrodes SME31, the $(1-4)^{th}$ segment sensing electrodes SME41, and the $(1-5)^{th}$ segment sensing electrodes SME51. The second segment sensing electrodes SME12, SME22, SME32, SME42, and SME52 include the $(2-1)^{th}$ segment sensing electrodes SME12, the $(2-2)^{th}$ segment sensing electrodes SME22, and the $(2-3)^{th}$ segment sensing electrodes SME32, the $(2-4)^{th}$ segment sensing electrodes SME42, and the $(2-5)^{th}$ segment sensing electrodes SME52.

Each of the $(1-1)^{th}$ to $(1-5)^{th}$ segment sensing electrodes SME11 to SME51 may include multiple first sub-segment sensing electrodes S_SME1 spaced apart from each other in the first and second directions DR1 and DR2. FIG. 12 illustratively illustrates six first sub-segment sensing electrodes S_SME1, but the disclosure is not limited thereto. For example, each of the $(1-1)^{th}$ to $(1-5)^{th}$ segment sensing electrodes SME11 to SME51 may include two first sub-segment sensing electrodes S_SME1 spaced apart in the second direction DR2 The first sub-segment sensing electrodes S_SME may be electrically connected to each other through first sub-bridge electrodes SBE1. Each of the first sub-segment sensing electrodes S_SME1 may have a rectangular shape including two horizontal sides parallel to the first direction DR1 and two vertical sides parallel to the second direction DR2.

Each of the $(2-1)^{th}$ to $(2-5)^{th}$ segment sensing electrodes SME12 to SME52 may include multiple second sub-segment sensing electrodes S_SME2 spaced apart from each other in the first and second directions DR1 and DR2. FIG. 12 illustratively illustrates six second sub-segment sensing electrodes S_SME2, but the disclosure is not limited thereto. For example, each of the $(2-1)^{th}$ to $(2-5)^{th}$ segment sensing electrodes SME12 to SME52 may include two second sub-segment sensing electrodes S_SME2 spaced apart from each other in the second direction DR2. The second sub-segment sensing electrodes S_SME2 may be electrically connected to each other through second sub-bridge electrodes SBE2. Each of the second sub-segment sensing electrodes S_SME2 may have a rectangular shape including two horizontal sides parallel to the first direction DR1 and two vertical sides parallel to the second direction DR2.

In a first row, the $(1-1)^{th}$ segment sensing electrodes SME11 and the $(2-1)^{th}$ segment sensing electrodes SME12 may be alternately arranged in the first direction DR1, and in a second row, the $(1-2)^{th}$ segment sensing electrodes SME21 and the $(2-2)^{th}$ segment sensing electrodes SME22 may be alternately arranged in the first direction DR1. In a third row, the $(1-3)^{th}$ segment sensing electrodes SME31 and the $(2-3)^{th}$ segment sensing electrodes SME32 may be alternately arranged in the first direction DR1, and in a fourth row, the $(1-4)^{th}$ segment sensing electrodes SME41 and the $(2-4)^{th}$ segment sensing electrodes SME42 may be alternately arranged in the first direction DR1. In a fifth row, the $(1-5)^{th}$ segment sensing electrodes SME51 and the $(2-5)^{th}$ segment sensing electrodes SME52 may be alternately arranged in the first direction DR1. As an example of the disclosure, the $(1-1)^{th}$ to $(1-5)^{th}$ segment sensing electrodes SME11 to SME51 may be arranged to correspond to the first open part T_OP1 of the odd-numbered column sensing electrodes TE1, TE3, and TE5, and the $(2-1)^{th}$ to $(2-5)^{th}$ segment sensing electrodes SME12 to SME52 may be arranged to correspond to the second open part T_OP2 of the even-numbered column sensing electrodes TE2, TE4, and TE6.

The input sensor ISPd further may include a $(1-1)^{th}$ connection wiring line SCL11 that electrically connects the $(1-1)^{th}$ segment sensing electrodes SME11 and a $(2-1)^{th}$ connection wiring line SCL12 that electrically connects the $(2-1)^{th}$ segment sensing electrodes SME12. The input sensor ISPd further may include a $(1-2)^{th}$ connection wiring line SCL21 that electrically connects the $(1-2)^{th}$ segment sensing electrodes SME21 and a $(2-2)^{th}$ connection wiring line SCL22 that electrically connects the $(2-2)^{th}$ segment sensing electrodes SME22.

The input sensor ISPd may further include a $(1-3)^{th}$ connection wiring line SCL31 that electrically connects the $(1-3)^{th}$ segment sensing electrodes SME31 and a $(2-3)^{th}$ connection wiring line SCL32 that electrically connects the $(2-3)^{th}$ segment sensing electrodes SME32. The input sensor ISPd may further include a $(1-4)^{th}$ connection wiring line SCL41 that electrically connects the $(1-4)^{th}$ segment sensing electrodes SME41 and a $(2-4)^{th}$ connection wiring line SCL42 that electrically connects the $(2-4)^{th}$ segment sensing electrodes SME42. The input sensor ISPd may further include a $(1-5)^{th}$ connection wiring line SCL51 that electrically connects the $(1-5)^{th}$ segment sensing electrodes SME51 and a $(2-5)^{th}$ connection wiring line SCL52 that electrically connects the $(2-5)^{th}$ segment sensing electrodes SME52.

The $(1-1)^{th}$ to $(1-5)^{th}$ segment sensing electrodes SME11 to SME51 may be electrically connected to the $(1-1)^{th}$ to $(1-5)^{th}$ connection wiring lines SCL11 to SCL51 through a first connection contact hole CCH1, respectively, and the $(2-1)^{th}$ to $(2-5)^{th}$ segment sensing electrodes SME12 to SME52 may be electrically connected to the $(2-1)^{th}$ to $(2-5)^{th}$ connection wiring lines SCL12 to SCL52 through a second connection contact hole CCH2, respectively. The $(1-1)^{th}$ to $(1-5)^{th}$ connection wiring lines SCL11 to SCL51 may extend in the first direction DR1, and the $(2-1)^{th}$ to $(2-5)^{th}$ connection wiring lines SCL12 to SCL52 may extend in the first direction DR1. The $(1-1)^{th}$ to $(1-5)^{th}$ connection wiring lines SCL11 to SCL51 and the $(2-1)^{th}$ to $(2-5)^{th}$ connection wiring lines SCL12 to SCL52 may be spaced apart from each other in the second direction DR2.

The input sensor ISPd may further include first segment trace lines electrically connected to the first segment sensing electrodes SME11, SME21, SME31, SME41, and SME51 and second segment trace lines electrically connected to the second segment sensing electrodes SME12, SME22, SME32, SME42, and SME52. As an example of the disclosure, the first segment trace lines include $(1-1)^{th}$ to $(1-5)^{th}$ segment trace lines, and the second segment trace lines may include $(2-1)^{th}$ to $(2-5)^{th}$ segment trace lines. However, for convenience of description, FIG. 12 illustrates the $(1-3)^{th}$ to $(1-5)^{th}$ segment trace lines SSL31, SSL41, and SSL51 among the $(1-1)^{th}$ to $(1-5)^{th}$ segment trace lines and the $(2-3)^{th}$ to $(2-5)^{th}$ segment trace lines SSL32, SSL42, and SSL52 among the $(2-1)^{th}$ to $(2-5)^{th}$ segment trace lines.

The $(1-3)^{th}$ to $(1-5)^{th}$ segment trace lines SSL31, SSL41, and SSL51 and the $(2-3)^{th}$ to $(2-5)^{th}$ segment trace lines SSL32, SSL42, and SSL52 may extend in the second direction DR2. The $(1-3)^{th}$ to $(1-5)^{th}$ segment trace lines SSL31, SSL41, and SSL51 and the $(2-3)^{th}$ to $(2-5)^{th}$ segment trace lines SSL32, SSL42, and SSL52 may be arranged in the sensing area SA. As an example of the disclosure, the $(1-3)^{th}$ to $(1-5)^{th}$ segment trace lines SSL31, SSL41, and SSL51 may be arranged to correspond to the first open part T_OP1 of the odd-numbered column sensing electrodes TE1, TE3, and TE5, and the $(2-3)^{th}$ to $(2-5)^{th}$ segment trace lines SSL32, SSL42, and SSL52 may be arranged to correspond to the second open part T_OP2 of the even-numbered column sensing electrodes TE2, TE4, and TE6.

The $(1-3)^{th}$ segment trace lines SSL31 may be electrically connected to one of the $(1-3)^{th}$ segment sensing electrodes SME31 through a $(1-3)^{th}$ segment contact hole SCH31. The $(1-3)^{th}$ segment trace lines SSL31 may be electrically connected to another of the $(1-3)^{th}$ segment sensing electrodes SME31 through the $(1-3)^{th}$ connection wiring line SCL31. The $(2-3)^{th}$ segment trace lines SSL32 may be electrically connected to one of the $(2-3)^{th}$ segment sensing electrodes SME32 through a $(2-3)^{th}$ segment contact hole SCH32. The $(2-3)^{th}$ segment trace lines SSL32 may be electrically connected to another of the $(2-3)^{th}$ segment sensing electrodes SME32 through the $(2-3)^{th}$ connection wiring line SCL32.

The $(1-4)^{th}$ segment trace lines SSL41 may be electrically connected to one of the $(1-4)^{th}$ segment sensing electrodes SME41 through a $(1-4)^{th}$ segment contact hole SCH41. The $(1-4)^{th}$ segment trace lines SSL41 may be electrically connected to another of the $(1-4)^{th}$ segment sensing electrodes SME41 through the $(1-4)^{th}$ connection wiring line SCL41. The $(2-4)^{th}$ segment trace lines SSL42 may be electrically connected to one of the $(2-4)^{th}$ segment sensing electrodes SME42 through a $(2-4)^{th}$ segment contact hole SCH42. The $(2-4)^{th}$ segment trace lines SSL42 may be electrically connected to another of the $(2-4)^{th}$ segment sensing electrodes SME42 through the $(2-4)^{th}$ connection wiring line SCL42.

The $(1-5)^{th}$ segment trace lines SSL51 may be electrically connected to one of the $(1-5)^{th}$ segment sensing electrodes SME51 through a $(1-5)^{th}$ segment contact hole SCH51. The $(1-5)^{th}$ segment trace lines SSL51 may be electrically connected to another of the $(1-5)^{th}$ segment sensing electrodes SME51 through the $(1-5)^{th}$ connection wiring line SCL51. The $(2-5)^{th}$ segment trace lines SSL52 may be electrically connected to one of the $(2-5)^{th}$ segment sensing electrodes SME52 through a $(2-5)^{th}$ segment contact hole SCH52. The $(2-5)^{th}$ segment trace lines SSL52 may be electrically connected to another of the $(2-5)^{th}$ segment sensing electrodes SME52 through the $(2-5)^{th}$ connection wiring line SCL52.

Alternatively, some of the first segment trace lines and some of the second segment trace lines may be arranged to correspond to the boundary open part T_BOP.

Each of the first and second segment trace lines may include an intersection portion and a non-intersection portion. The intersection portion may be a portion that intersects the $(1-1)^{th}$ to $(1-5)^{th}$ connection wiring lines SCL11 to SCL51 and the $(2-1)^{th}$ to $(2-5)^{th}$ connection wiring lines SCL12 to SCL52, and the non-intersection portion may be a portion that does not intersect with the $(1-1)^{th}$ to $(1-5)^{th}$ connection wiring lines SCL11 to SCL51 and the $(2-1)^{th}$ to $(2-5)^{th}$ connection wiring lines SCL12 to SCL52. As illustrated in FIG. 13A, as an example of the disclosure, intersection portions SLP2 of the $(1-5)^{th}$ segment trace lines SSL51 may intersect the $(1-5)^{th}$ and $(2-4)^{th}$ connection wiring lines SCL51 and SCL42, and intersection portions SLP2 of the $(2-5)^{th}$ segment trace lines SSL52 may intersect the $(1-5)^{th}$ and $(2-4)^{th}$ connection wiring lines SCL51 and SCL42. Non-intersection portions SLP1 of the $(1-5)^{th}$ segment trace lines SSL51 and non-intersection portions SLP1 of the $(2-5)^{th}$ segment trace lines SSL52 may be portions that do not intersect the $(1-5)^{th}$ and $(2-4)^{th}$ connection wiring lines SCL51 and SCL42.

The intersection portion of each segment trace line may be disposed on a different layer from that of the non-intersection portion. The non-intersection portions of the first and second segment trace lines, the $(1-1)^{th}$ to $(1-5)^{th}$ connection wiring lines SCL11 to SCL51, and the $(2-1)^{th}$ to $(2-5)^{th}$ connection wiring lines SCL12 to SCL52 may be arranged on a same layer (e.g., the first sensor insulating layer IIL1). The intersection portions of the first and second segment trace lines and the first and second segment sensing electrodes may be arranged on a same layer (e.g., the second sensor insulating layer IIL2). For example, the intersection portions SLP2 of the $(2-5)^{th}$ segment trace lines SSL52 may be arranged on the second sensor insulating layer IIL2, and the second sensor insulating layer IIL2 may be provided with third and fourth line contact holes BCNT3 and BCNT4 through which the non-intersection portions SLP1 of the $(2-5)^{th}$ segment trace lines SSL52 may be exposed. Thus, the intersection portions SLP2 of the $(2-5)^{th}$ segment trace lines SSL52 may be electrically connected to the non-intersection portions SLP1 of the $(2-5)^{th}$ segment trace lines SSL52 through the third and fourth line contact holes BCNT3 and BCNT4.

Accordingly, even in case that the segment trace lines intersect the $(1-1)^{th}$ to $(1-5)^{th}$ connection wiring lines SCL11 to SCL51 and the $(2-1)^{th}$ to $(2-5)^{th}$ connection wiring lines SCL12 to SCL52, the segment trace lines may not be electrically connected to each other at intersection portions.

The sensing controller TIC (see FIG. 5) may include multiple differential amplifiers. As an example of the disclosure, the sensing controller TIC may include five differential amplifiers (i.e., first to fifth differential amplifiers). FIG. 12 illustratively illustrates only three differential amplifiers (i.e., third to fifth differential amplifiers DAMP3, DAMP4, and DAMP5) among the five differential amplifiers. The $(1-3)^{th}$ to $(1-5)^{th}$ segment trace lines SSL31, SSL41, and SSL51 may be electrically connected to first terminals (e.g., negative terminals) of the third to fifth differential amplifiers DAMP3, DAMP4, and DAMP5, respectively. The $(2-3)^{th}$ to $(2-5)^{th}$ segment trace lines SSL32, SSL42, and SSL52 may be electrically connected to second terminals (e.g., positive terminals) of the third to fifth differential amplifiers DAMP3, DAMP4, and DAMP5, respectively.

A signal input to the first terminal of each of the third to fifth differential amplifiers DAMP3, DAMP4, and DAMP5 may be referred to as a first reception signal, and a signal input to the second terminal of each of the third to fifth differential amplifiers DAMP3, DAMP4, and DAMP5 may be referred to as a second reception signal. Each of the third to fifth differential amplifiers DAMP3, DAMP4, and DAMP5 may generate a difference between the first reception signal and the second reception signal as an output signal. The sensing controller TIC (see FIG. 5) may acquire a touch information in the sensing area SA using the difference between the first reception signal and the second reception signal.

The first segment sensing electrodes SME11, SME21, SME31, SME41, and SME51 and the second segment sensing electrodes SME12, SME22, SME32, SME42, and SME52 may be alternately arranged in one row, and the first segment sensing electrodes SME11, SME21, SME31, SME41, and SME51 and the second segment sensing electrodes SME12, SME22, SME32, SME42, and SME52 may provide signals sensed at locations (i.e., the first and second reception signals) to the corresponding differential amplifiers DAMP3, DAMP4, and DAMP5. The sensing controller TIC may compensate for a touch detection signal based on the difference between the first and second reception signals received through the differential amplifiers DAMP3, DAMP4, and DAMP5, and as a result, noise included in the first or second reception signal may be removed by another reception signal. Thus, a signal-to-noise ratio may be improved, and the overall sensing sensitivity of the input sensor ISPd may be improved.

Figure 14:
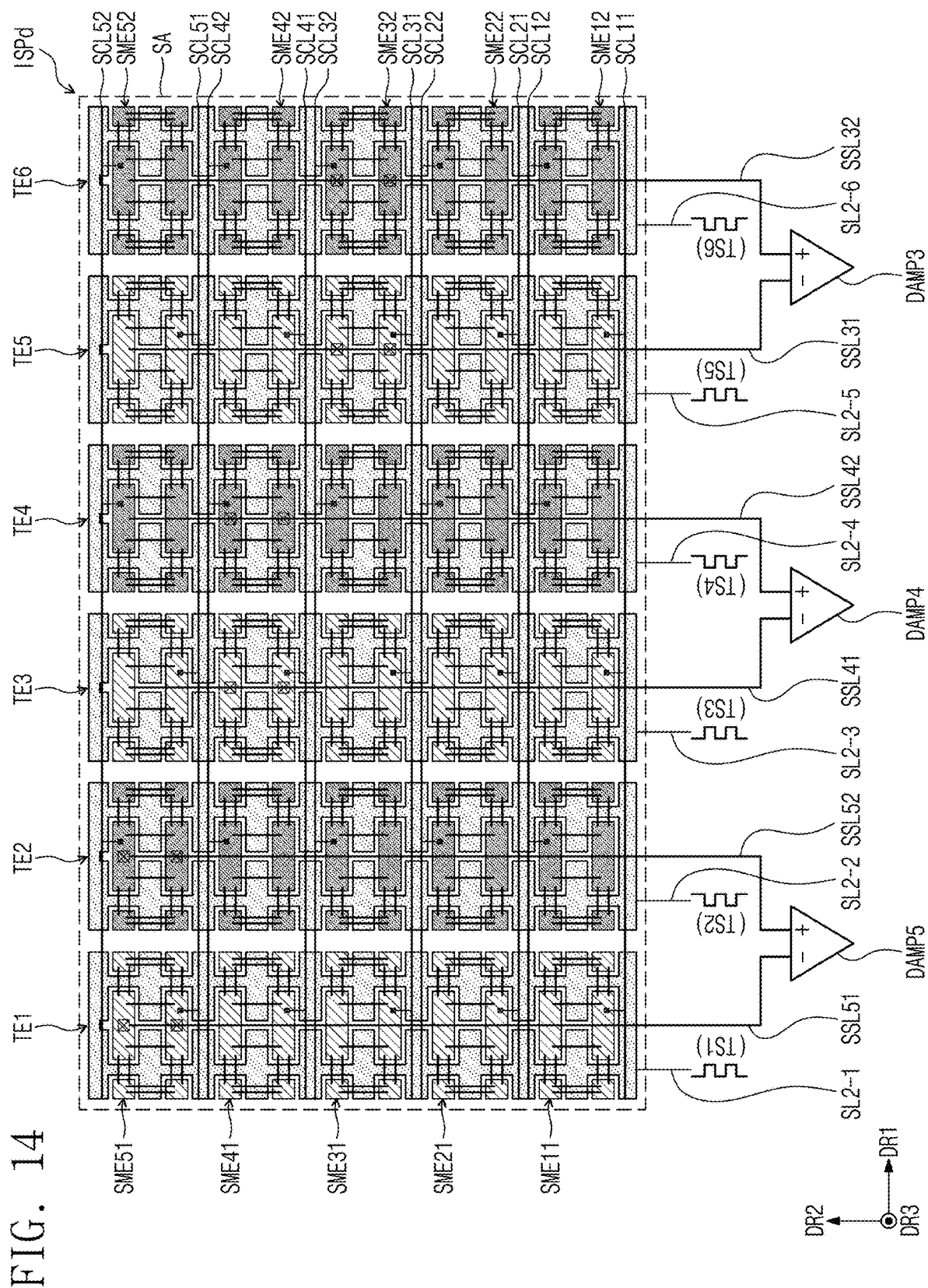
FIG. 14 is a plan view illustrating column sensing electrodes driven by a differential driving method according to an embodiment of the disclosure.

FIG. 14 is a plan view illustrating column sensing electrodes driven by a differential driving method according to an embodiment of the disclosure. Components illustrated in FIG. 14 which may be identical to the components illustrated in FIG. 12 may be marked by the same reference numerals/signs, and thus additional description will be omitted to avoid redundancy.

Referring to FIG. 14, the input sensor ISPd may include the first segment sensing electrodes SME11, SME21, SME31, SME41, and SME51, the second segment sensing electrodes SME12, SME22, SME32, SME42, and SME52, and the column sensing electrodes TE1 to TE6.

Each of the column sensing electrodes TE1 to TE6 may extend in the second direction DR2. The column sensing electrodes TE1 to TE6 may be spaced apart from each other in the first direction DR1. For example, the column sensing electrodes TE1 to TE6 may include the first to sixth column sensing electrodes TE1 to TE6.

First to sixth transmission signals TS1, TS2, TS3, TS4, TS5, and TS6 may be applied to the first to sixth column sensing electrodes TE1 to TE6, respectively. The first to sixth transmission signals TS1 to TS6 may be applied to the first to sixth column sensing electrodes TE1 to TE6 simultaneously (i.e., at the same time). Alternatively, in a first scan cycle, the first and second transmission signals TS1 and TS2 may be simultaneously applied to the first and second column sensing electrodes TE1 and TE2, and in a second scan cycle, the third and fourth transmission signals TS3 and TS4 may be simultaneously applied to the third and fourth column sensing electrodes TE3 and TE4.

As an example of the disclosure, among the first to sixth transmission signals TS1 to TS6, two transmission signals applied to two adjacent column sensing electrodes may have phases inverted from each other. For example, the first, third, and fifth transmission signals TS1, TS3, and TS5 applied to the odd-numbered column sensing electrodes TE1, TE3, and TE5 may swing with a phase inverted from that of the second, fourth, and sixth transmission signals TS2, TS4, and TS6 applied to the even-numbered column sensing electrodes TE2, TE4, and TE6. The first, third, and fifth transmission signals TS1, TS3, and TS5 may have the same phase, and the second, fourth, and sixth transmission signals TS2, TS4, and TS6 may have the same phase.

In case that the first to sixth transmission signals TS1 to TS6 having inverted phases are supplied to the first to sixth column sensing electrodes TE1 to TE6, even in case that a ripple occurs in a potential of the second electrode CE due to a parasitic capacitance between the input sensor ISP and the second electrode CE (see FIG. 4), the ripple may be canceled. Thus, flicker due to the parasitic capacitance may be removed, and as a result, in case that an external input is sensed, degradation of display quality of the display panel DP due to the parasitic capacitance may be improved.

Figure 15:
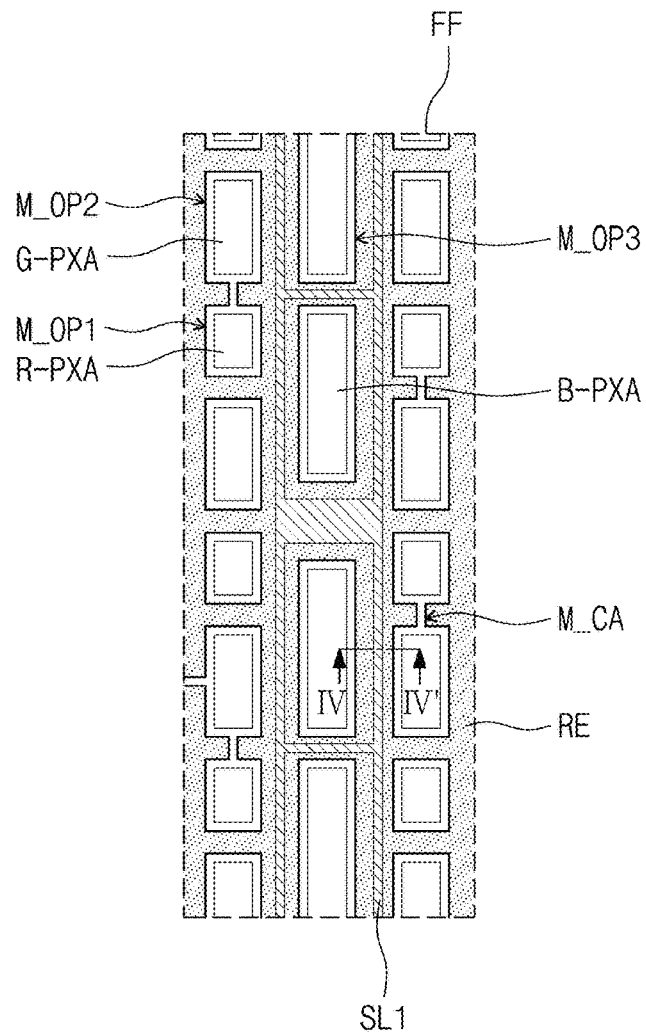
FIG. 15 is an enlarged plan view illustrating part FF of the input sensor illustrated in FIG. 6.
Figure 16:
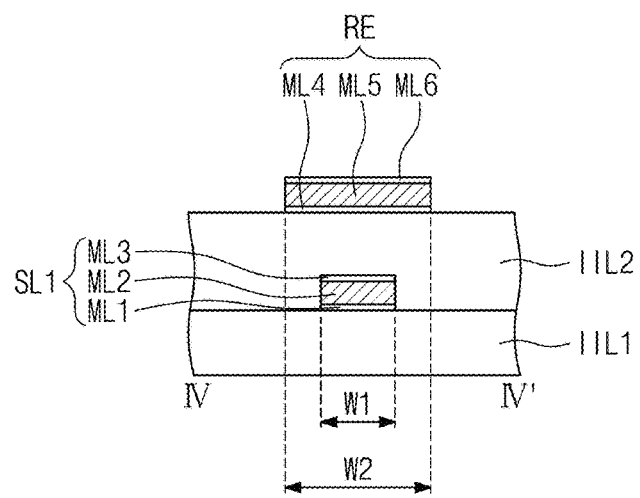
FIG. 16 is a schematic cross-sectional view along cutting line IV-IV' illustrated in FIG. 15.

FIG. 15 is an enlarged plan view illustrating part FF of the input sensor illustrated in FIG. 6. FIG. 16 is a schematic cross-sectional view along cutting line IV-IV' illustrated in FIG. 15.

Referring to FIGS. 15 and 16, each of the row sensing electrodes RE may include multiple mesh lines that intersect each other and may have a mesh shape in which multiple mesh open parts M_OP1, M_OP2, and M_OP3 may be defined by the mesh lines. The mesh open parts M_OP1, M_OP2, and M_OP3 may correspond to light emitting areas R-PXA, G-PXA, and B-PXA of each of the pixels provided in the display panel DP.

As an example of the disclosure, the mesh openings M_OP1, M_OP2, and M_OP3 may include three mesh openings having different sizes (i.e., a first mesh opening M_OP1, a second mesh opening M_OP2, and a third mesh opening M_OP3). The first mesh opening M_OP1 may correspond to the first light emitting area (i.e., a red light emitting area R-PXA), the second mesh opening M_OP2 may correspond to the second light emitting area (i.e., a green light emitting area G-PXA), and the third mesh opening M_OP3 may correspond to the third light emitting area (i.e., a blue light emitting area B-PXA), among the light emitting areas R-PXA, G-PXA, and B-PXA. As an example of the disclosure, the third mesh opening M_OP3 may have a larger size than that of the second mesh opening M_OP2, and the second mesh opening M_OP2 may have a larger size than that of the first mesh opening M_OP1.

Cut areas M_CA may be provided in the mesh lines. The mesh lines may be spaced apart (separated) from the cut areas M_CA.

As illustrated in FIG. 16, the row sensing electrodes RE may be arranged on a different layer from that of the first trace lines SL1. The first trace lines SL1 may be arranged on the first sensor insulating layer IIL1, and the row sensing electrodes RE may be arranged on the second sensor insulating layer IIL2. As an example of the disclosure, a first width W1 of the first trace lines SL1 may be smaller than a second width W2 of each of the mesh lines. Thus, even in case that the first trace lines SL1 are arranged under the row sensing electrodes RE inside the sensing area SA (see FIG. 5), the first trace lines SL1 may be prevented from being visually recognized.

Each of the first trace lines SL1 may have a single-layer structure or a multi-layer structure in which multiple films may be laminated in the third direction DR3 (see FIG. 4). In case that the first trace lines SL1 have a multi-layer structure in the same width, wiring resistance of each of the first trace lines SL1 may be reduced. As an example of the disclosure, each of the first trace lines SL1 may have a three-layer structure. For example, each of the first trace lines SL1 may include a first metal film ML1, a second metal film ML2, and a third metal film ML3 that may be sequentially laminated. The first and third metal films ML1 and ML3 may include titanium, and the second metal film ML2 may include aluminum. As an example of the disclosure, to reduce wiring resistance of each of the first trace lines SL1, the second metal film ML2 may have a thickness of about 6000 Å or more. Thus, even in case that the first width W1 of each of the first trace lines SL1 is smaller than the second width W2, the wiring resistance may be prevented from increasing.

FIG. 16 illustrates only the first trace lines SL1, but in FIGS. 5 to 14, wiring lines arranged on the first sensor insulating layer IIL1, for example, the bridge electrode BE, the connection wiring lines SCL11 to SCL52, the second trace lines SL2, and the first and second sub-bridge electrodes SBE1 and SBE2 may be designed to have a smaller width than that of the mesh lines, and thus visibility may be improved.

The second sensor insulating layer IIL2 may include an organic film. The organic film may include at least one of an acryl-based resin, a methacrylate-based resin, a polyisoprene-based resin, a vinyl-based resin, an epoxy-based resin, an urethane-based resin, a cellulose-based resin, a siloxane-based resin, a polyimide-based resin, a polyamide-based resin, a perylene-based resin, and a combination thereof.

The mesh lines of the row sensing electrodes RE may be arranged on the second sensor insulating layer IIL2 and may have a single-layer structure or a multi-layer structure. As an example of the disclosure, each of the mesh lines may have a three-layer structure. For example, each of the mesh lines may include a fourth metal film ML4, a fifth metal film ML5, and a sixth metal film ML6 that may be sequentially laminated. The fourth and sixth metal films ML4 and ML6 may include titanium, and the fifth metal film ML5 may include aluminum.

According to the above description, sides defining row sensing electrodes and column sensing electrodes may be arranged parallel to a first direction and a second direction. Thus, in case that a pen moves in the first direction, a capacitance with the row sensing electrodes may be maintained constant without changing, and as a result, a position and slope of the pen may be accurately sensed.

Further, trace lines electrically connected to row sensing electrodes may be arranged to overlap a sensing area. Thus, a width of the non-sensing area may be reduced, and as a result, a bezel width of the electronic device may be reduced overall.

Although the description has been made above with reference to an embodiment of the disclosure, it may be understood that those skilled in the art or those having ordinary knowledge in the art may variously modify and change the disclosure without departing from the spirit and technical scope of the disclosure described in the appended claims. Accordingly, the technical scope of the disclosure is not limited to the detailed description of the specification but should be defined by the appended claims.

What is claimed is:

1. An electronic device comprising:
a display layer in which a display area and a non-display area adjacent to the display area are defined; and
a sensor layer in which a sensing area corresponding to the display area and a non-sensing area adjacent to the sensing area are defined, wherein
the sensor layer includes:
a plurality of row sensing electrodes arranged in the sensing area and including a plurality of sub-sensing electrodes arranged in a first direction;
a plurality of first trace lines electrically connected to the plurality of row sensing electrodes and overlapping the sensing area;
a plurality of column sensing electrodes arranged in the sensing area and extending in a second direction intersecting the first direction;
a plurality of second trace lines electrically connected to the plurality of column sensing electrodes; and
a bridge electrode electrically connecting a first sub-sensing electrode and a second sub-sensing electrode spaced apart from each other in the first direction among the plurality of sub-sensing electrodes,
each of the plurality of column sensing electrodes includes an open part extending in the second direction and overlapping one of the plurality of first trace lines, and
the one of the plurality of first trace lines does not overlap the bridge electrode in the open part.

2. The electronic device of claim 1, wherein a boundary open part is defined between two column sensing electrodes spaced apart from each other among the plurality of column sensing electrodes.

3. The electronic device of claim 2, wherein
the first sub-sensing electrode overlaps the open part, and
the second sub-sensing electrode overlaps the boundary open part.

4. The electronic device of claim 2, wherein
each of the plurality of column sensing electrodes includes:
a first sensing part disposed between the first sub-sensing electrode and the second sub-sensing electrode in the first direction; and
a second sensing part extending from the first sensing part in the second direction and having a greater width than a width of the first sensing part, and
the first sensing part and the second sensing part are integral with each other.

5. The electronic device of claim 4, wherein the bridge electrode overlaps the first sensing part.

6. The electronic device of claim 2, wherein
each of the plurality of row sensing electrodes includes:
a first sub-row sensing electrode; and
a second sub-row sensing electrode spaced apart from the first sub-row sensing electrode in the second direction, and
the first sub-row sensing electrode and the second sub-row sensing electrode are electrically connected to each other.

7. The electronic device of claim 6, wherein each of the plurality of first trace lines is electrically connected to the first sub-row sensing electrode through a first sub-contact hole and is electrically connected to the second sub-row sensing electrode through a second sub-contact hole.

8. The electronic device of claim 6, wherein each of the plurality of row sensing electrodes further includes a connection electrode disposed in the non-display area and electrically connecting the first sub-row sensing electrode and the second sub-row sensing electrode to each other.

9. The electronic device of claim 2, wherein the sensor layer further includes:
a plurality of dummy trace lines electrically connected to the plurality of row sensing electrodes and overlapping the sensing area.

10. The electronic device of claim 9, wherein one of the plurality of dummy trace lines overlaps the boundary open part.

11. The electronic device of claim 1, wherein
the sensing area includes a first sub-sensing area and a second sub-sensing area spaced apart from each other in the first direction, and
the plurality of row sensing electrodes includes first side row sensing electrodes arranged in the first sub-sensing area and second side row sensing electrodes arranged in the second sub-sensing area.

12. The electronic device of claim 11, wherein
the first side row sensing electrodes are spaced apart from and electrically isolated from the second side row sensing electrodes in the first direction, and
the plurality of first trace lines include:
first side trace lines overlapping the first sub-sensing area and electrically connected to the first side row sensing electrodes; and
second side trace lines overlapping the second sub-sensing area and electrically connected to the second side row sensing electrodes.

13. The electronic device of claim 1, wherein
the sensing area includes:
a first sub-sensing area and a second sub-sensing area spaced apart from each other in the first direction; and
a third sub-sensing area and a fourth sub-sensing area spaced apart from each other in the first direction and spaced apart from the first sub-sensing area and the second sub-sensing area in the second direction, and
the plurality of row sensing electrodes include:
first side row sensing electrodes arranged in the first sub-sensing area;
second side row sensing electrodes arranged in the second sub-sensing area;
third side row sensing electrodes arranged in the third sub-sensing area; and
fourth side row sensing electrodes arranged in the fourth sub-sensing area.

14. The electronic device of claim 13, wherein
the first side row sensing electrodes are spaced apart from and electrically isolated from the second side row sensing electrodes in the first direction,
the third side row sensing electrodes are spaced apart from and electrically isolated from the fourth side row sensing electrodes in the first direction, and
the plurality of first trace lines include:
$(1\text{-}1)^{th}$ trace lines overlapping the first sub-sensing area and electrically connected to the first side row sensing electrodes;
$(1\text{-}2)^{th}$ trace lines overlapping the second sub-sensing area and electrically connected to the second side row sensing electrodes;
$(1\text{-}3)^{th}$ trace lines overlapping the third sub-sensing area and electrically connected to the third side row sensing electrodes; and
$(1\text{-}4)^{th}$ trace lines overlapping the fourth sub-sensing area and electrically connected to the fourth side row sensing electrodes.

15. The electronic device of claim 13, wherein the plurality of column sensing electrodes include:
first side column sensing electrodes arranged in the first sub-sensing area;
second side column sensing electrodes arranged in the second sub-sensing area;
third side column sensing electrodes arranged in the third sub-sensing area and spaced apart from the first side column sensing electrodes in the second direction; and
fourth side column sensing electrodes arranged in the fourth sub-sensing area and spaced apart from the second side column sensing electrodes in the second direction.

16. The electronic device of claim 15, wherein the plurality of second trace lines include:
$(2\text{-}1)^{th}$ side trace lines electrically connected to the first side column sensing electrodes;
$(2\text{-}2)^{th}$ side trace lines electrically connected to the second side column sensing electrodes;
$(2\text{-}3)^{th}$ side trace lines overlapping the first sub-sensing area and electrically connected to the third side column sensing electrodes; and
$(2\text{-}4)^{th}$ side trace lines overlapping the second sub-sensing area and electrically connected to the fourth side column sensing electrodes.

17. The electronic device of claim 16, wherein each of the (2-3)th side trace lines and the $(2\text{-}4)^{th}$ side trace lines includes:
a first line part, the first line part and the plurality of first trace lines being disposed on a same layer; and
a second line part, the second line part and the plurality of column sensing electrodes being disposed on a same layer.

18. The electronic device of claim 1, wherein
each of the plurality of row sensing electrodes and each of the plurality of column sensing electrodes includes mesh lines, and
each of the plurality of first trace lines has a smaller width than that of the mesh lines in the sensing area.

19. The electronic device of claim 18, wherein each of the plurality of first trace lines has a multi-layer structure.

20. An electronic device comprising:
a display layer in which a display area and a non-display area adjacent to the display area are defined;
a sensor layer in which a sensing area corresponding to the display area and a peripheral area adjacent to the sensing area are defined; and
a sensor driving portion electrically connected to the sensor layer and including a differential amplifier,
wherein
the sensor layer includes:
first segment sensing electrodes arranged in the sensing area;
second segment sensing electrodes arranged in the sensing area and alternately arranged in a first direction with the first segment sensing electrodes;
a plurality of first segment trace lines overlapping the sensing area and electrically connecting the first segment sensing electrodes to a first terminal of the differential amplifier;

a plurality of second segment trace lines overlapping the sensing area and electrically connecting the second segment sensing electrodes to a second terminal of the differential amplifier;

a plurality of column sensing electrodes arranged in the sensing area and extending in a second direction intersecting the first direction; and a plurality of second trace lines electrically connected to the plurality of column sensing electrodes, wherein each of the first segment sensing electrodes includes:

a plurality of first sub-segment electrodes; and a first sub-bridge electrode electrically connecting the plurality of first sub-segment electrodes, and each of the second segment sensing electrodes includes:

a plurality of second sub-segment electrodes; and a second sub-bridge electrode electrically connecting the plurality of second sub-segment electrodes, a first column sensing electrode among the plurality of column sensing electrodes includes a first open part extending in the second direction and overlapping one of the plurality of first segment trace lines, a second column sensing electrode among the plurality of column sensing electrodes includes a second open part extending in the second direction and overlapping one of the plurality of second segment trace lines, the one of the plurality of first segment trace lines does not overlap the first sub-bridge electrode in the first open part, and the one of the plurality of second segment trace lines does not overlap the second sub-bridge electrode in the second open part.

21. The electronic device of claim 20, wherein the sensor layer further includes:

a first connection wiring line electrically connecting $(1\text{-}1)^{th}$ segment sensing electrodes arranged in a first row among the first segment sensing electrodes; and a second connection wiring line electrically connecting $(2\text{-}1)^{th}$ segment sensing electrodes arranged in the first row among the second segment sensing electrodes, and the first connection wiring line and the second connection wiring line extend in the first direction and intersect the plurality of column sensing electrodes in a plan view.

22. The electronic device of claim 21, wherein each of the plurality of first segment trace lines and the plurality of second segment trace lines includes:

an intersection portion intersecting the first connection wiring line and the second connection wiring line; and a non-intersection portion not intersecting the first connection wiring line and the second connection wiring line, and the intersection portion and the non-intersection portion are arranged in different layers.

23. The electronic device of claim 22, wherein the non-intersection portion, the first connection wiring line, and the second connection wiring line are arranged on a first sensor insulating layer, and the intersection portion, the first segment sensing electrodes, and the second segment sensing electrodes are arranged on a second sensor insulating layer.

24. The electronic device of claim 21, wherein the first sub-bridge electrode and the second sub-bridge electrode are arranged on a different layer from that of the first sub-segment electrodes and the second sub-segment electrodes, and the first sub-bridge electrode, the second sub-bridge electrode, the first connection wiring line, and the second connection wiring line are arranged on a same layer.

25. The electronic device of claim 20, wherein the sensor driving portion is configured to:

provide a first transmission signal to the first column sensing electrode among the plurality of column sensing electrodes; and provide a second transmission signal to the second column sensing electrode adjacent to the first column sensing electrode among the plurality of column sensing electrodes, and the first transmission signal and the second transmission signal have phases opposite to each other.

* * * * *